United States Patent [19]
Aoki et al.

[11] Patent Number: 4,999,007
[45] Date of Patent: Mar. 12, 1991

[54] VARI-FOCAL LENS SYSTEM

[75] Inventors: Norihiko Aoki; Hirofumi Tsuchida; Atsujirou Ishii, all of Tokyo, Japan

[73] Assignee: Olympus Optical Co., Ltd., Tokyo, Japan

[21] Appl. No.: 301,971

[22] Filed: Jan. 26, 1989

[30] Foreign Application Priority Data

Jan. 28, 1988 [JP] Japan ............................... 63-15949
Feb. 19, 1988 [JP] Japan ............................... 63-35022
Feb. 25, 1988 [JP] Japan ............................... 63-40758

[51] Int. Cl.$^5$ .......................................... G02B 15/177
[52] U.S. Cl. ................................................. 350/426
[58] Field of Search ...................... 350/423, 426, 427

[56] References Cited

U.S. PATENT DOCUMENTS 4,647,160 3/1987 Ikemori .
4,792,215 12/1988 Sato .................................... 350/426

FOREIGN PATENT DOCUMENTS 58-102208 6/1983 Japan .
58-153913 9/1983 Japan .
59-64811 4/1984 Japan .
61-110112 5/1986 Japan .
62-266511 11/1987 Japan .

Primary Examiner—Bruce Y. Arnold
Assistant Examiner—Rebecca D. Gass
Attorney, Agent, or Firm—Cushman, Darby & Cushman

[57] ABSTRACT

A vari-focal lens system comprising, in the order from the object side a movable front lens unit having negative refractive power and a movable rear lens unit having positive refractive power, said front lens unit consists of a negative lens component and a positive lens component or a single negative lens component, and said rear lens unit comprising at least one negative lens component. Said vari-focal lens system consists of a very small number of lens components, concretely specifically three or four lens components.

16 Claims, 33 Drawing Sheets

VARI-FOCAL LENS SYSTEM

BACKGROUND OF THE INVENTION (a) Field of the invention

The present invention relates to a vari-focal lens system for cameras, and more specifically a vari-focal lens system for video cameras.

(b) Description of the Prior Art

In the recent years where compact, light-weight video cameras are offered at low prices, demand for domestic video cameras is increasing rapidly. In order to further develop this demand, it is necessary to design more compact video cameras having lower weight and manufacturable at lower cost, thereby posing problems to obtain more compact lens systems having lower weight and manufacturable at lower cost.

Currently, lens systems for domestic video cameras are designed mainly as zoom lens systems specified for a zoom ratio of 6 and an aperture ratio of F/1.2 to F/1.6. This is because these specifications are very advantageous for lens design and adequate for meeting practical needs.

These zoom lens systems generally consist of four lens units as exemplified by the lens systems disclosed by Japanes Unexamined Published Patent Applications Nos. 102208/58 and 153913/58. However, these zoom lens systems have a common defect that each lens system comprises as many as 14 or 15 lens components, requires high manufacturing cost, has a large diameter and is heavy in weight.

Further, there is also known, as a zoom lens system of this type, the lens system disclosed by Japanese Unexamined Published Patent Application No. 110112/61. However, this lens system requires higher manufacturing cost since it adopts extremely strong curvature on a cemented lens surface though it comprises a reduced number of eight lens components in combination with an aspherical surface.

The conventional zoom lens systems consisting of four lens units generally comprise, in the order from the object side, a first lens unit having positive refractive power, kept fixed during variation of focal length and having focusing function, a second lens unit having negative refractive power and movable for varying focal length, a third lens unit shifted for correcting deviation of image point due to variation of focal length, and a fourth lens unit having positive refractive power, kept fixed at all times and adopted for imaging.

This type of zoom lens systems consisting of four lens units are suited for obtaining high vari-focal ratios and high aperture ratios, but generally comprise a very large number of lens components, concretely 14 to 15 lens components in total, since the first lens unit consists of three lens components, the second lens unit consists of three lens components, the third lens unit consists of one or two lens components, and the fourth lens unit consists of six to eight lens components.

In addition to the zoom lens systems consisting of four lens units, there are known zoom lens systems consisting of two lens units. These zoom lens systems comprise, in the order from the object side, a first lens unit having negative refractive power and a second lens unit having positive refractive power, and is so designed as to perform variation of focal length by varying an airspace reserved between these lens units. Such a zoom lens system consisting of two lens units is not suited for obtaining a high vari-focal ratio and a high aperture ratio, but comprises a small number of lens components, concretely six to eight lens components. Further, a stop arranged in the second lens unit is generally shifted together with the second lens unit for varying focal length and focusing of the zoom lens system is performed by shifting the first lens unit frontward.

When this type of zoom lens system consisting of two lens unit is used in a video camera, the mechanism for shifting the stop along the optical axis is made very complicated due to the fact that the stop for a video camera is large and heavy.

As a zoom lens system which has corrected this defect, there is known the zoom lens system disclosed by Japanese Unexamined Published Patent Application No. 266511/62. The official bulletin of this patent discloses a lens system which consists of two lens units and a stop arranged therebetween. However, the patent specification describes power distribution only but provides no actual numerical data clarifying aberration characteristics.

SUMMARY OF THE INVENTION

An object of the present invention is to provide a compact vari-focal lens system consisting of a small number of lens components, having light weight and manufacturable at low cost.

Another object of the present invention is to provide a vari-focal lens system using aspherical surfaces adequately, consisting of a small number of lens components and having favorably corrected aberrations.

The vari-focal lens system according to the present invention consists, in the order from the object side, a movable front lens unit having negative refractive power and a movable rear lens unit having positive refractive power, or three or four lens components in total, said front lens unit comprising a negative lens component and a positive lens component or a single negative lens component only, and said rear lens unit comprising at least one negative lens component.

When a stop is arranged in the rear lens unit as in the most cases of the conventional zoom lens systems consisting of two lens units, it is necessary to compose the front lens unit of three lens components and the rear lens unit of four or five lens components for favorably correcting aberrations. When a stop is arranged between the front lens unit and the rear lens unit in such a zoom lens system consisting of two lens units, coma and astigmatism produced by the rear lens unit are aggravated especially at the wide position.

Further, in order to avoid mechanical interference between the lens units and the stop, it is obliged to select a composition in which the front lens unit is widely shifted toward the object side at the wide position. Accordingly, the offaxial ray passes through the high portion of the front lens unit, especially the high portion of the front lens component at the wide position, whereby the distortion and astigmatism produced by the front lens unit are aggravated.

In order to correct the above-mentioned aberrations, it is necessary to compose the lens system of an increased number of lens components. When the lens system is composed of an increased number of lens components, a larger space is occupied by the lens components and the space allowing shift of the lens units is narrowed, thereby making it impossible to obtain a high vari-focal ratio. If it is attempted to obtain a high vari-focal ratio in this condition, each of the lens unit will have strong power, thereby producing a vicious cycle to aggravate the aberrations.

The vari-focal lens system according to the present invention is designed in such a manner that a large space is reserved for shifting the lens units by reducing the number of the lens components and the aberrations are corrected favorably by weakening power of each lens unit though the lens system comprises a small number of lens components and is manufacturable at low cost.

In order to obtain a lens system comprising a small number of lens components and having favorably corrected aberrations, it is necessary to select an adequate lens composition in combination with a proper power distribution. For this reason, the lens system according to the present invention has selected the composition described above.

Furthermore, in order to obtain a more preferable zoom lens system which is capable of accomplishing the object of the present invention, it is desirable to design the lens system so as to satisfy the following condition:

(1) $0.1 < f_W/|f_F| < 0.5$
(2) $0.2 < f_W/f_R < 0.8$ wherein the reference symbol $f_W$ represents focal length of the zoom lens system as a whole at the wide position thereof, the reference symbol $f_F$ designates focal length of the front lens unit and the reference symbol $F_R$ denotes focal length of the rear lens unit.

The condition (1) defines power of the front lens unit. If 0.1 defined as the lower limit of the condition (1) is exceeded, the power distribution for the retrofocus type lens system is weakened, thereby making it difficult to obtain a long back focal length and enlarging the front lens unit. If 0.5 defined as the upper limit of the condition (1) is exceeded, in contrast, the distortion and asigmatism produced by the front lens unit will be undesirabl aggravated.

The condition (2) defines power of the rear lens unit. If 0.2 defined as the lower limit of the condition (2) is exceeded, the rear lens unit will have a large diameter. If 0.8 defined as the upper limit of the condition (2) is exceeded, the coma and astigmatism produced by the rear lens unit will be too remarkable, and a long back focal length cannot be obtained.

In the vari-focal lens system according to the present invention, the distortion and astigmatism produced by the rear lens unit are apt to be aggravated as field angle of the lens system becomes wider. In order to correct these aberrations, it is effective to design at least one surface in the front lens unit as an aspherical surface having portions whose negative refractive power is weakened as they are farther from the optical axis. When the intersection between the aspherical surface and the optical axis is taken as the origin, the direction along the optical axis is taken as the x axis and the direction perpendicular to the optical axis is taken as the y axis, the aspherical surface is expressed by the following formula (A):

$$x = \frac{Cy^2}{1 + \sqrt{1 - pC^2y^2}} + \sum_{i=1}^{n} A_{2i} y^{2i} \quad (A)$$

wherein the reference symbol C represents curvature at the vertex of the aspherical surface (curvature of the basic spherical surface), the reference symbol p designates the coefficient of cone and the reference symbol $A_{2i}$ denotes the coefficient of aspherical surface.

It is desirable for the aspherical surface to satisfy the following condition (3):

(3) $|\Delta x_F/h| < 1 \quad (y = y_{EC})$ wherein the reference symbol $\Delta x_F$ represents deviation of the aspherical surface used in the front lens unit from the basic aspherical surface, the reference symbol h designates maximum image height, the reference symbol y denotes height as measured from the optical axis and the reference symbol $y_{EC}$ represents height of the principal ray on said aspherical surface at the maximum field angle at the wide position.

If the condition (3) is not satisfied, distortion will be overcorrected and coma will be undesirably aggravated.

In order to correct the coma produced by the rear lens unit, it is effective to design at least one surface in the rear lens unit as an aspherical surface having portions whose refractive power is reduced as they are farther from the optical axis. Especially when a positive lens component is arranged on the image side of the negative lens component in the rear lens unit, it is effective to use an aspherical surface on this positive lens component. This aspherical surface is also expressed by the formula (A) mentioned above.

It is desirable for the aspherical surface used in the rear lens unit to satisfy the following condition (4):

(4) $\Delta x_R/h < 0.1 \quad (y = y_{EC})$ wherein the reference symbol $\Delta x_R$ represents deviation of the aspherical surface used in the rear lens unit from the basic spherical surface thereof, the reference symbol h designates maximum image height, the reference symbol y denotes height as measured from the optical axis and the reference symbol $y_{EC}$ represents height of the principal ray on this surface at the maximum field angle at the wide position.

If the condition (4) is not satisfied, spherical aberration and coma will be undesirably overcorrected.

The vari-focal lens system according to the present invention adopts the aspherical surfaces for the purpose of favorably correcting the aberrations with a great merit that the aberrations can be corrected favorably without increasing the number of the lens components, i.e., without narrowing the space allowing the shift of the lens components. In this fundamental composition, it is possible to divide the rear lens unit arranged after the stop into a third subunit and a fourth subunit comprising the negative lens component, and vary the airspace reserved between these subunits for zooming. In this case, it is desirable to design the rear lens unit so as to satisfy the following conditions:

(5) $-1 < \beta_R < -0.1$
(6) $f_W/f_3 < 1.2$
(7) $f_W/f_4 < 1$
(8) $\nu_{4n} < 60$ wherein the reference symbol $\beta_R$ represents magnification of the rear lens unit at the wide position, the reference symbol $f_3$ designates focal length of the third subunit, the reference symbol $f_4$ denotes focal length of the fourth subunit and the reference symbol $\nu_{4n}$ represents Abbe's number of the negative lens element arranged in the fourth subunit.

The condition (5) defines magnification for imaging the virtual image formed by the front lens unit. If $-1$ defined as the lower limit of the condition (5) is exceeded, the front lens unit will have stronger negative power, thereby producing and undesirable effect to aggravate negative distortion, astigmatism and coma. If $-0.1$ defined as the upper limit of the condition (5) is exceeded, it will be difficult to prolong back focal length of the vari-focal lens system.

The conditions (6) and (7) define power distribution more detailedly in the rear lens unit in addition to the definition by the condition (5). If 1.2 defined as the upper limit of the condition (6) is exceeded, spherical aberration and coma will be aggravated, or if 1 defined as the upper limit of the condition (7) is exceeded, astigmatism will be aggravated, and any of the aberrations cannot be corrected with a small number of lens components.

The condition (8) defines Abbe's number of the negative lens element arranged in the fourth subunit. If the negative lens element has an Abbe's number smaller than 60, chromatic aberration, especially lateral chromatic aberration, will be undercorrected.

In the next place, it is possible, in the vari-focal lens system according to the present invention, to obtain good result by dividing the front lens unit arranged before the stop into a first subunit having negative refractive power and a second subunit consisting of a positive lens component, designing the rear lens unit arranged after the stop so as to comprise at least one negative component, and independently shifting said first subunit, said second subunit and the rear lens unit while varying the relative positions thereof for varying focal length with the image point kept fixed. Speaking more concretely, this design enhances flexibility for correction of the aberrations, and makes it possible to obtain a vari-focal lens system having a vari-focal ratio of 2 to 3, an aperture ratio of F/2 to F/4.5 and favorably corrected aberrations.

As a lens system similar to the vari-focal lens system having the composition described above, there is known the lens system disclosed by U.S. Pat No. 4,647,160. This lens system comprises a first negative lens unit, a second positive lens unit and a third positive lens unit, and is so designed as to perform variation of focal length by shifting the second lens unit. In this vari-focal lens system, the third lens unit has relatively weak refractive power and the function to converge rays is imparted mainly to the second lens unit. Accordingly, the second lens unit requires at least one negative lens component for correcting aberrations and must comprise at least four lens components as a whole. Further, the third lens unit has the role of the so-called field flattener which is used for correcting curvature of field and coma. The vari-focal lens system according to the present invention is fundamentally composed of the front lens unit and the rear lens unit, said front lens unit being divided into the first subunit and the second subunit, or the rear lens unit being divided into the third subunit and the fourth subunit a described below. By selecting this composition, the present invention has succeeded in composing a vari-focal lens system by using lens components of a smaller number than that of the lens components used in the conventional lens systems.

When the lens units are arranged as described above, it is desirable to design the lens system so as to satisfy the following conditions (9) through (12):

(9) $-1 < \beta_{2,R} < -0.1$
(10) $f_W/f_2 < 1.2$
(11) $f_W/f_R < 1$
(12) $\nu_{Rn} < 60$ wherein the reference symbol $\beta_{2,R}$ represents total magnification of the second subunit and the rear lens unit at the wide position, the reference symbol $f_2$ designates focal length of the second subunit arranged in the front lens unit, the reference symbol $F_R$ designates focal length of the rear lens unit and the reference symbol $\nu_{Rn}$ denotes Abbe's number of the negative lens element arranged in the rear lens unit.

The condition (9) defines magnification for imaging the virtual image formed by the first subunit arranged in the front lens unit. If $-1$ defined as the lower limit of the condition (9) is exceeded, the first subunit will have strong negative power, thereby undesirably aggravating negative distortion, astigmatism and coma. If $-0.1$ defined as the upper limit of the condition (9) is exceeded, it will be difficult to prolong back focal length of the vari-focal lens system.

The condition (10) and (11) define power distribution in the lens units more detailedly in addition to the definition by the condition (9). If 1.2 defined as the upper limit of the condition (10) is exceeded, spherical aberration and coma will be aggravated or if 1 defined as the upper limit of the condition (11) is exceeded, astigmatism will be aggravated, and any of the aberrations cannot be corrected with a small number of lens components.

The condition (12) defines Abbe's number of the negative lens component in the rear lens unit. If the negative lens component has an Abbe's number smaller than 60, chromatic aberration, especially lateral chromatic aberration, will be undercorrected.

Further, the vari-focal lens system according to the present invention can be designed in such a manner that the front lens unit is divided into the first subunit and the second subunit, and the rear lens unit is divided into the subunit 1F and the fourth subunit 1R, and the first subunit, the second subunit, the subunit 1F and the subunit 1R are shifted while varying relative positions thereof.

When the lens units are arranged as described above, it is desirable to design the vari-focal lens system so as to satisfy the following conditions (13) through (17):

(13) $-2 < f_W/f_1 < -0.1$
(14) $0.1 < f_W/f_{234} < 1$
(15) $HH/f_W < 15$
(16) $EP/f_W < 5$
(17) $40 < \nu_1$ wherein the reference symbol $f_1$ represents focal length of the first subunit arranged in the front lens unit, the reference symbol $f_{234}$ designates total focal length of the second subunit, the third subunit 1F and the subunit 1R at the wide position, the reference symbol HH denotes distance between the principal points of the vari-focal lens system as a whole at the wide position, the reference symbol EP represents position of the entrance pupil at the wide position, and the reference symbol $\nu_1$ designates Abbe's number of the first subunit arranged in the front lens unit.

The vari-focal lens system according to the present invention comprises the first lens unit having positive refractive power on the extreme object side and has the same characteristic as that of the so-called retrofocus lens system. Accordingly, the asymmetrical aberrations such as distortion and astigmatism are apt to be remarkable in the vari-focal lens system. Especially, the negative distortion produced at the wide position is apt to be aggravated under the influence due to the first subunit having negative refractive power.

The condition (13) defines power of the first subunit mentioned above. If $-2$ defined as the lower limit of the condition (13) is exceeded, the first subunit will have too strong power, thereby making it impossible to sufficiently correct the negative distortion produced at the wide position. If −0.1 defined as the upper limit of the condition (13) is exceeded, it will be necessary to prolong the shift distance for the first subunit for varying focal length, thereby prolonging total length of the lens system.

The condition (14) defines total focal length of the second subunit, the subunit 1F, and the submit 1R at the wide position. If 0.1 defined as the lower limit of the condition (14) is exceeded, the positive refractive power of the retrofocus type lens system will be too strong, thereby making it impossible to sufficiently correct the negative distortion produced at the wide position. If 1 defined as the upper limit of the condition (14) is exceeded, the vari-focal lens system will not have the power distribution of the retrofocus type lens system, thereby making it impossible to reserve a sufficiently long back focal length.

The condition (15) and (16) are adopted for designing a compact vari-focal lens system.

If 15 defined as the upper limit of the condition (15) is exceeded, total length of the vari-focal lens system will be too long.

If 5 defined as the upper limit of the condition (16) is exceeded, position of the entrance pupil will be shifted toward the image side and the front lens component will have too large a diameter.

It will be impossible to design a compact varifocal lens system if the condition (15) or (16) is not satisfied.

The condition (17) is required for favorably correcting chromatic aberration. If 40 defined as the lower limit of the condition (17) is exceeded, it will be impossible to correct chromatic aberration, especially lateral chromatic aberration.

For correcting aberrations in the vari-focal lens system according to the present invention, it is effective to adopt aspherical surfaces even when the front lens unit is divided into the two subunits. For adopting aspherical surface(s) in the first subunit, it is effective to design at least one lens surface as an aspherical surface having portions whose negative refractive power is weakened as they are farther from the optical axis. This aspherical surface is expressed by the above-mentioned formula (A). The above-mentioned aspherical surface arranged in the condition (14):

(18) $|\Delta x_F|/h < 1$ ($y = y_{EC}$)

wherein the reference symbol $\Delta x_F$ represents deviation of the aspherical surface from the basic spherical surface, the reference symbol h designates maximum image height, the reference symbol y denotes height as measured from the optical axis and the reference symbol $y_{EC}$ represents height of the principal ray on the aspherical surface at the maximum field angle at the wide position.

If the condition (18) is not satisfied, distortion will be overcorrected and, in addition, coma will be undesirably aggravated.

An attempt to design the lens system so as to have a high aperture ratio on the order of F/2.8 will pose a problem of aggravation of spherical aberration and coma. In order to correct these aberrations, it is effective to design at least one surface in the second subunit arranged in the front lens unit or in the rear lens unit proper as an aspherical surface having portions whose positive refractive power is weakened as they are farther from the optical axis. Coma is corrected favorably especially when such an aspherical surface is adopted in the rear lens unit. This aspherical surface adopted in the second subunit or the rear lens unit is also expressed by the above-mentioned formula (A).

The aspherical surface used in the second subunit or the rear lens unit should desirably satisfy the following condition (19):

(19) $|\Delta x_{2,R}|/h < 0.1$ ($y = y_{2.8}$)

wherein the reference symbol $\Delta x_{2,R}$ represents deviation of the above-mentioned aspherical surface from the basic spherical surface, the reference symbol h designates maximum image height and the reference symbol $y_{2.8}$ denotes height of the marginal ray having an aperture ratio of 2.8 on this surface.

If 1 defined as the upper limit of the condition (19) is exceeded, spherical aberration will be undesirably overcorrected.

In the vari-focal lens system according to the present invention, a stop is arranged between the front lens unit and the rear lens unit as already described. It is desirable to keep this stop fixed during variation of focal length for simplifying the lens barrel structure. Since the stop used in video cameras especially has a very large and complicated structure as already described, the effect obtainable by using a fixed stop is far higher for video cameras than that for film cameras.

The vari-focal lens system according to the present invention can be focused by shifting frontward the lens system as a whole or the first subunit only. Further, it is possible to perform focusing of the vari-focal lens system by shifting frontward the second subunit wholly or partially, or the rear lens unit wholly or partially.

The focusing by shifting frontward the first subunit generally has a merit that shift distance for focusing is not changed by variation of focal length. However, this focusing mode has defects that it requires shifting a heavy subunit and that it is apt to cause eclipse of rays after focusing. The focusing by shifting frontward the second subunit arranged in the front lens unit or the rear lens unit proper has a merit that it allows focusing with light load since the lens to be shifted for focusing is light. Therefore, the latter focusing mode is very effective for accelerating focusing speed for automatically focusing cameras.

DETAILED DESCRIPTION OF THE PREFERRED EMBODIMENTS

Figure 1:
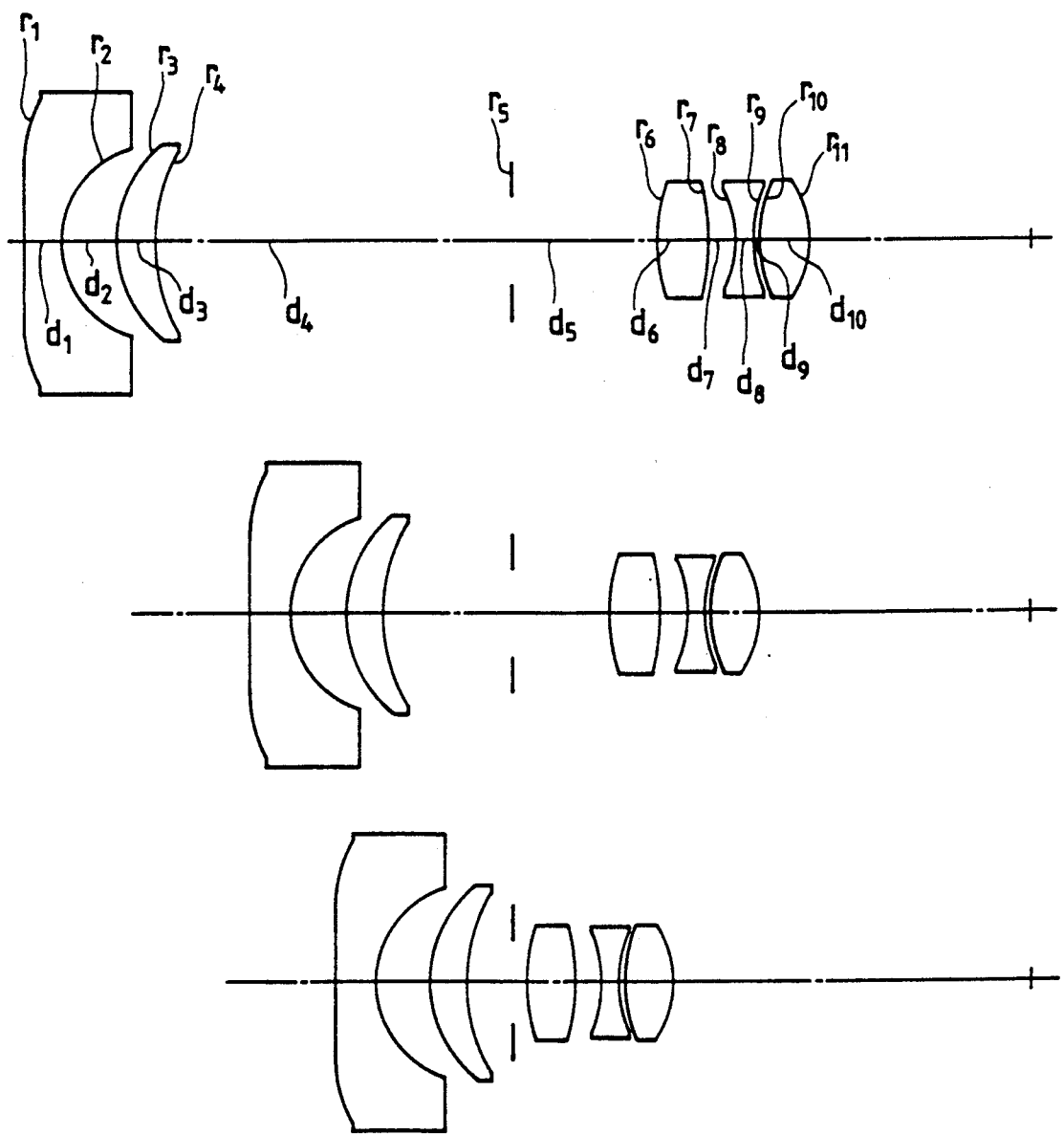
FIG. 1 through FIG. 13 show sectional views illustrating Embodiments 1 through 13 of the vari-focal lens system according to the present invention.

Now, the preferred embodiments of the vari-focal lens system according to the present invention will be described concretely in the form of numerical data with reference to the accompanying drawings:

Embodiment 1
$f = 7.21-20.4$, F/2.8-F/4.5
Maximum image height 4.2, $2\omega = 61°-24°$ $r_1 = -233.7665$ (aspherical surface)
  $d_1 = 3.0000$    $n_1 = 1.49216$    $\nu_1 = 57.50$
$r_2 = 7.8592$
  $d_2 = 4.6190$
$r_3 = 10.4222$
  $d_3 = 3.0000$    $n_2 = 1.58320$    $\nu_2 = 30.45$
$r_4 = 13.9521$
  $d_4 = D_1$ (variable)
$r_5 = \infty$ (stop)
  $d_5 = D_2$ (variable)
$r_6 = 13.5633$
  $d_6 = 4.1711$    $n_3 = 1.69700$    $\nu_3 = 48.51$
$r_7 = -22.5400$
  $d_7 = 2.3400$
$r_8 = -8.6821$
  $d_8 = 1.2000$    $n_4 = 1.58320$    $\nu_4 = 30.45$
$r_9 = 9.6628$
  $d_9 = 0.6199$
$r_{10} = 13.0467$
  $d_{10} = 3.9981$    $n_5 = 1.49216$    $\nu_5 = 57.50$
$r_{11} = -8.2939$ (aspherical surface)

| f | 7.21 | 12 | 20.4 |
|---|------|-----|------|
| $D_1$ | 28.760 | 10.574 | 3.900 |
| $D_2$ | 12.233 | 8.181 | 1.100 | aspherical coefficient
first surface P = 1.0000, $A_2 = 0$
$A_4 = 0.60904 \times 10^{-4}$, $A_6 = 0.12875 \times 10^{-6}$
$A_8 = 0.47724 \times 10^{-9}$
11th surface P = 1.0000, $A_2 = 0$
$A_4 = 0.83648 \times 10^{-4}$, $A_6 = 0.41216 \times 10^{-6}$
$A_8 = -0.66100 \times 10^{-7}$
$f_W/|f_F| = 0.33$, $f_W/f_R = 0.39$
$|\Delta x_F|/h = 0.217$, $|\Delta x_R|/h = 0.004$ Embodiment 2
$f = 9-36$, F/2.8-F/5.9
Maximum image height 4, $2\omega = 50°-13°$ $r_1 = 26.2863$ (aspherical surface)
  $d_1 = 1.5000$    $n_1 = 1.69680$    $\nu_1 = 56.49$
$r_2 = 8.9305$
  $d_2 = 3.0000$
$r_3 = 10.0907$
  $d_3 = 2.0000$    $n_2 = 1.68893$    $\nu_2 = 31.08$
$r_4 = 12.5490$
  $d_4 = D_1$ (variable)
$r_5 = \infty$ (stop)
  $d_5 = D_2$ (variable)
$r_6 = 10.7573$
  $d_6 = 3.6381$    $n_3 = 1.78650$    $\nu_3 = 50.00$
$r_7 = -27.3456$
  $d_7 = 1.0551$
$r_8 = -16.8356$
  $d_8 = 4.2941$    $n_4 = 1.78470$    $\nu_4 = 26.22$
$r_9 = 39.1256$
  $d_9 = 2.5515$
$r_{10} = 68.3012$
  $d_{10} = 1.5668$    $n_5 = 1.80400$    $\nu_5 = 46.57$
$r_{11} = 128.6527$ (aspherical surface)

| f | 9 | 20 | 36 |
|---|---|-----|-----|
| $D_1$ | 33.728 | 5.801 | 3.000 |
| $D_2$ | 17.547 | 10.805 | 1.000 | aspherical coefficient
first surface P = 1.0000, $A_2 = 0$
$A_4 = 0.18060 \times 10^{-4}$, $A_6 = 0.38879 \times 10^{-7}$
$A_8 = 0.12775 \times 10^{-8}$
11th surface P = 1.0000, $A_2 = 0$
$A_4 = 0.18757 \times 10^{-3}$, $A_6 = 0.11268 \times 10^{-4}$
$A_8 = -0.18129 \times 10^{-6}$
$f_W/|f_F| = 0.30$, $f_W/f_R = 0.48$
$|\Delta x_F|/h = 0.035$, $|\Delta x_R|/h = 0.009$ Embodiment 3
$f = 6.5-13$, F/2.8-F/3.2
Maximum image height 4, $2\omega = 66°-35°$ $r_1 = 29.0559$
  $d_1 = 2.1752$    $n_1 = 1.67790$    $\nu_1 = 55.33$
$r_2 = 12.5083$
  $d_2 = 6.0503$
$r_3 = 11.7655$
  $d_3 = 2.2790$    $n_2 = 1.69895$    $\nu_2 = 30.12$
$r_4 = 10.3647$ (aspherical surface)
  $d_4 = D_1$ (variable)
$r_5 = \infty$ (stop)
  $d_5 = D_2$ (variable)
$r_6 = 9.3732$
  $d_6 = 1.9346$    $n_3 = 1.69700$    $\nu_3 = 48.51$
$r_7 = 536.7007$
  $d_7 = 2.1171$
$r_8 = -8.4278$
  $d_8 = 1.7630$    $n_4 = 1.69895$    $\nu_4 = 30.12$
$r_9 = 12.9798$
  $d_9 = 0.7974$
$r_{10} = 84.0854$
  $d_{10} = 1.5599$    $n_5 = 1.67790$    $\nu_5 = 55.33$
$r_{11} = -12.0610$
  $d_{11} = 0.2482$
$r_{12} = 65.4025$
  $d_{12} = 1.5787$    $n_6 = 1.67790$    $\nu_6 = 55.33$
$r_{13} = -11.8216$

| f | 6.5 | 8.5 | 13 |
|---|-----|-----|-----|
| $D_1$ | 32.171 | 18.876 | 5.000 |
| $D_2$ | 4.120 | 3.160 | 1.000 | aspherical coefficient
first surface P = 1.0000, $A_2 = 0$
$A_4 = -0.62284 \times 10^{-4}$, $A_6 = 0.44367 \times 10^{-6}$
$A_8 = -0.10183 \times 10^{-7}$
$f_W/|f_F| = 0.23$, $f_W/f_R = 0.47$
$|\Delta x_F|/h = 0.080$ Embodiment 4
$f = 9-18$, F/3.5-F/4.0
Maximum image height 4, $2\omega = 49°-25°$ $r_1 = 19.2227$
  $d_1 = 2.0000$    $n_1 = 1.69680$    $\nu_1 = 56.49$
$r_2 = 10.9190$ (aspherical -continued surface)

$r_3 = \infty$ (stop)

$r_4 = 10.7105$ $r_5 = -43.6280$ $r_6 = -10.1391$ $r_7 = 17.2459$ $r_8 = -50.0583$ $r_9 = -8.3168$
(aspherical
surface)

$d_2 = D_1$ (variable)
$d_3 = D_2$ (variable)
$d_4 = 3.7453$  $n_2 = 1.78800$  $\nu_2 = 47.38$
$d_5 = 1.1252$
$d_6 = 0.7777$  $n_3 = 1.78470$  $\nu_3 = 26.30$
$d_7 = 1.0314$
$d_8 = 2.2170$  $n_4 = 1.80400$  $\nu_4 = 46.57$

| f | 9 | 12 | 18 |
|---|---|---|---|
| $D_1$ | 42.305 | 24.518 | 8.000 |
| $D_2$ | 8.855 | 7.585 | 5.045 | aspherical coefficient
2nd surface P = 1.0000, $A_2 = 0$
$A_4 = -0.14187 \times 10^{-4}$, $A_6 = 0.21916 \times 10^{-6}$
$A_8 = -0.80249 \times 10^{-8}$
9th surface P = 1.0000, $A_2 = 0$
$A_4 = 0.97388 \times 10^{-4}$, $A_6 = 0.20677 \times 10^{-5}$
$A_8 = -0.92816 \times 10^{-7}$
$f_W/|f_F| = 0.22$, $f_W/f_R = 0.53$
$|\Delta x_F|/h = 0.054$, $|\Delta x_R|/h = 0.002$

Embodiment 5
f = 8-16,  F/2-F/2.2
Maximum image height 4, $2\omega = 55°-29°$ $r_1 = \infty$
(aspherical
surface)

$r_2 = 19.6849$ $r_3 = \infty$ (stop)

$r_4 = 17.3408$ $r_5 = -355.5321$ $r_6 = 150.9988$ $r_7 = -32.3934$ $r_8 = -11.1109$ $r_9 = 22.5539$ $r_{10} = 37.4779$ $r_{11} = -10.5961$
(aspherical
surface)

$r_{12} = \infty$ $r_{13} = \infty$ $d_1 = 2.0000$  $n_1 = 1.49216$  $\nu_1 = 57.50$
$d_2 = D_1$ (variable)
$d_3 = D_2$ (variable)
$d_4 = 4.8606$  $n_2 = 1.78590$  $\nu_2 = 44.18$
$d_5 = 0.200$
$d_6 = 3.0965$  $n_3 = 1.77250$  $\nu_3 = 49.66$
$d_7 = 0.8000$
$d_8 = 1.0000$  $n_4 = 1.78470$  $\nu_4 = 26.30$
$d_9 = 0.6000$
$d_{10} = 2.6000$  $n_5 = 1.77250$  $\nu_5 = 49.66$
$d_{11} = D_3$ (variable)
$d_{12} = 10.0000$  $n_6 = 1.51633$  $\nu_6 = 64.15$

| f | 8 | 11.3 | 16 |
|---|---|---|---|
| $D_1$ | 44.130 | 21.290 | 6.000 |
| $D_2$ | 9.860 | 8.492 | 6.543 |
| $D_3$ | 2.000 | 3.368 | 5.316 | aspherical coefficient
first surface P = 1.0000, $A_2 = 0$
$A_4 = 0.82892 \times 10^{-5}$, $A_6 = 0.28376 \times 10^{-7}$
$A_8 = -0.13982 \times 10^{-9}$
11th surface P = 1.0000, $A_2 = 0$
$A_4 = 0.88431 \times 10^{-4}$, $A_6 = -0.16180 \times 10^{-6}$
$A_8 = -0.42180 \times 10^{-8}$
$f_W/|f_F| = 0.20$, $f_W/f_R = 0.48$
$|\Delta x_F|/h = 0.042$, $|\Delta x_R|/h = 0.004$

Embodiment 6
f = 7-14,  F/2.2-F/3.11
Maximum image height 4, $2\omega = 61.3°-32.1°$ $r_1 = 23.6096$ (aspherical
surface)

$r_2 = 5.7500$ $r_3 = \infty$ (stop)

$r_4 = 22.0057$ $r_5 = -14.1089$
(aspherical
surface)

$r_6 = 39.1457$ $r_7 = -6.3500$ $r_8 = -14.0783$
(aspherical
surface)

$d_1 = 1.2000$  $n_1 = 1.49216$  $\nu_1 = 57.50$
$d_2 = D_1$ (variable)
$d_3 = D_2$ (variable)
$d_4 = 2.8000$  $n_2 = 1.49216$  $\nu_2 = 57.50$
$d_5 = D_3$ (variable)
$d_6 = 4.8000$  $n_3 = 1.51633$  $\nu_3 = 64.15$
$d_7 = 1.2000$  $n_4 = 1.78472$  $\nu_4 = 25.68$

| f | 7 | 10 | 14 | (mm) |
|---|---|---|---|---|
| $D_1$ | 23.773 | 16.768 | 12.098 | |
| $D_2$ | 0.8 | 0.8 | 0.8 | |
| $D_3$ | 0.8 | 6.698 | 14.562 | | aspherical coefficient
first surface P = 1.0000, $A_4 = 0.14121 \times 10^{-3}$
$A_6 = 0.10111 \times 10^{-5}$, $A_8 = 0.13460 \times 10^{-7}$
5th surface P = 1.0000, $A_4 = 0.36912 \times 10^{-4}$
$A_6 = 0.15117 \times 10^{-6}$, $A_8 = -0.17931 \times 10^{-7}$
8th surface P = 1.0000, $A_4 = -0.85254 \times 10^{-4}$
$A_6 = 0.69883 \times 10^{-5}$, $A_8 = -0.24720 \times 10^{-6}$
$\beta_R = -0.44$ (infinite object point)
$f_W/f_3 = 0.39$, $f_W/f_4 = 0.19$
$|\Delta x_F|/h = 0.09$, $|\Delta x_{2,R}|/h = 0.001, 0.0006$

Embodiment 7
f = 9-18,  F/2.8
Maximum image height 4.2, $2\omega = 50.0°-26.3°$ $r_1 = 47.4524$ $r_2 = 15.8570$ $r_3 = 27.9744$ $r_4 = -254.0406$ $r_5 = \infty$ (stop)

$r_6 = 19.3522$ $r_7 = -20.0595$ $r_8 = -10.0190$ $r_9 = 16.9956$ $r_{10} = 53.6906$ $r_{11} = -10.4714$
(aspherical
surface)

$d_1 = 1.0000$  $n_1 = 1.69680$  $\nu_1 = 56.49$
$d_2 = D_1$ (variable)
$d_3 = 2.2977$  $n_2 = 1.72916$  $\nu_2 = 54.68$
$d_4 = D_2$ (variable)
$d_5 = D_3$ (variable)
$d_6 = 1.5000$  $n_3 = 1.77250$  $\nu_3 = 49.66$
$d_7 = 0.8000$
$d_8 = 1.0000$  $n_4 = 1.78470$  $\nu_4 = 26.30$
$d_9 = 1.0024$
$d_{10} = 2.0690$  $n_5 = 1.80440$  $\nu_5 = 39.58$

| f | 9.00 | 13.50 | 18.03 | (mm) |
|---|---|---|---|---|
| $D_1$ | 33.629 | 13.948 | 2.334 | |
| $D_2$ | 1.497 | 7.644 | 14.712 | |
| $D_3$ | 6.813 | 4.985 | 2.650 | | aspherical coefficient
P = 1.0000, $A_4 = -0.62631 \times 10^{-5}$
$A_6 = -0.19157 \times 10^{-5}$, $A_8 = 0.37725 \times 10^{-7}$
$\beta_{2,R} = -0.26$ (infinite object point)
$f_W/f_2 = 0.26$, $f_W/f_R = 0.47$
$|\Delta x_{2,R}|/h = 0.0002$

Embodiment 8
f = 9-18 mm,  F/2.8
Maximum image height 4.2 mm, $2\omega = 50.0°-26.3°$ $r_1 = 37.4933$ $r_2 = 12.6690$ $r_3 = 12.0453$ $d_1 = 1.1891$  $n_1 = 1.69100$  $\nu_1 = 54.84$
$d_2 = 1.0482$

|  |  |  |  |
|---|---|---|---|
| | $d_3 = 3.0349$ | $n_2 = 1.59270$ | $v_2 = 35.29$ |
| $r_4 = 12.5661$ | | | |
| | $d_4 = D_1$ (variable) | | |
| $r_5 = 25.9191$ | | | |
| | $d_5 = 1.9969$ | $n_3 = 1.72916$ | $v_3 = 54.68$ |
| $r_6 = -46.7549$ | | | |
| | $d_6 = D_2$ (variable) | | |
| $r_7 = \infty$ (stop) | | | |
| | $d_7 = 2.3623$ | | |
| $r_8 = 19.7612$ | | | |
| | $d_8 = 1.7501$ | $n_4 = 1.77250$ | $v_4 = 49.66$ |
| $r_9 = -53.1539$ | | | |
| | $d_9 = 0.6564$ | | |
| $r_{10} = -10.1149$ | | | |
| | $d_{10} = 1.0000$ | $n_5 = 1.78472$ | $v_5 = 25.68$ |
| $r_{11} = 13.5657$ | | | |
| | $d_{11} = 1.3194$ | | |
| $r_{12} = 47.9899$ | | | |
| | $d_{12} = 2.0438$ | $n_6 = 1.80610$ | $v_6 = 40.95$ |
| $r_{13} = -9.1562$ | | | |

| f | 9.00 | 13.52 | 18.02 | (mm) |
|---|---|---|---|---|
| $D_1$ | 30.753 | 17.651 | 11.143 | |
| $D_2$ | 1.000 | 7.868 | 14.699 | |

$\beta_{2,4} = -0.29$ (infinite object point)
$f_W/f_2 = 0.39$, $f_W/f_R = 0.37$

Embodiment 9
f = 7-14, F/2.8-F/3.09
Maximum image height 4, $2\omega = 59.5°-31.9°$

| | | | |
|---|---|---|---|
| $r_1 = 103.7703$ (aspherical surface) | | | |
| | $d_1 = 1.0000$ | $n_1 = 1.69680$ | $v_1 = 56.49$ |
| $r_2 = 20.9675$ | | | |
| | $d_2 = D_1$ (variable) | | |
| $r_3 = 14.6850$ | | | |
| | $d_3 = 1.6489$ | $n_2 = 1.71736$ | $v_2 = 29.51$ |
| $r_4 = 94.4622$ | | | |
| | $d_4 = D_2$ (variable) | | |
| $r_5 = \infty$ (stop) | | | |
| | $d_5 = D_3$ (variable) | | |
| $r_6 = -5.8073$ | | | |
| | $d_6 = 1.1163$ | $n_3 = 1.78472$ | $v_3 = 25.68$ |
| $r_7 = -92.4892$ | | | |
| | $d_7 = 0.2236$ | | |
| $r_8 = 27.8641$ | | | |
| | $d_8 = 2.0000$ | $n_4 = 1.78650$ | $v_4 = 50.00$ |
| $r_9 = -6.5513$ (aspherical surface) | | | |

| f | 7 | 10.0 | 14 | (mm) |
|---|---|---|---|---|
| $D_1$ | 47.256 | 23.136 | 5.647 | |
| $D_2$ | 1.000 | 1.866 | 0.775 | |
| $D_3$ | 4.329 | 3.082 | 1.000 | | aspherical coefficient
first surface P = 1.0000, $A_4 = 0.25175 \times 10^{-5}$
$A_6 = 0.92098 \times 10^{-8}$, $A_8 = -0.20519 \times 10^{-10}$
9th surface P = 1.0000, $A_4 = 0.50419 \times 10^{-3}$
$A_6 = -0.24167 \times 10^{-5}$, $A_8 = 0.61558 \times 10^{-6}$
$\beta_{2,R} = -0.18$ (infinite object point)
$f_W/f_2 = 0.29$, $f_W/f_R = 0.36$
$|\Delta x_F|/h = 0.02$, $|\Delta x_{2,R}|/h = 0.007$

Embodiment 10
f = 5.5-11 mm, F/2.8-F/2.94
Maximum image height 4 mm, $2\omega = 72.1°-40.0°$

| | | | |
|---|---|---|---|
| $r_1 = 50.4410$ (aspherical surface) | | | |
| | $d_1 = 1.0000$ | $n_1 = 1.69680$ | $v_1 = 56.49$ |
| $r_2 = 13.2267$ | | | |
| | $d_2 = D_1$ (variable) | | |
| $r_3 = 12.9067$ | | | |
| | $d_3 = 1.7672$ | $n_2 = 1.74077$ | $v_2 = 27.79$ |
| $r_4 = 43.5215$ | | | |
| | $d_4 = D_2$ (variable) | | |
| $r_5 = \infty$ (stop) | | | |
| | $d_5 = D_3$ (variable) | | |
| $r_6 = -4.6067$ | | | |
| | $d_6 = 0.6133$ | $n_3 = 1.78470$ | $v_3 = 26.22$ |
| $r_7 = 29.0953$ | | | |
| | $d_7 = 0.3000$ | | |
| $r_8 = 85.3979$ | | | |
| | $d_8 = 1.2814$ | $n_4 = 1.78650$ | $v_4 = 50.00$ |
| $r_9 = -8.4203$ | | | |
| | $d_9 = 0.0007$ | | |
| $r_{10} = 115.2802$ | | | |
| | $d_{10} = 1.4593$ | $n_5 = 1.78650$ | $v_5 = 50.00$ |
| $r_{11} = -7.3823$ (aspherical surface) | | | |

| f | 5.5 | 7.8 | 11 | (mm) |
|---|---|---|---|---|
| $D_1$ | 37.671 | 19.149 | 4.634 | |
| $D_2$ | 3.164 | 2.633 | 1.319 | |
| $D_3$ | 4.457 | 3.179 | 1.332 | | aspherical coefficient
first surface P = 1.0000, $A_4 = 0.27239 \times 10^{-4}$
$A_6 = -0.24124 \times 10^{-7}$, $A_8 = 0.71417 \times 10^{-10}$
11th surface P = 1.0000, $A_4 = 0.23588 \times 10^{-3}$
$A_6 = 0.52892 \times 10^{-5}$, $A_8 = -0.27177 \times 10^{-6}$
$\beta_{2,R} = -0.21$ (infinite object point)
$f_W/f_2 = 0.23$, $f_W/f_R = 0.42$
$|\Delta x_F|/h = 0.17$, $|\Delta x_R|/h = 0.002$

Embodiment 11
f = 9-18, F/2.8
Maximum image height 4,2, $2\omega = 50.0°-26.3°$

| | | | |
|---|---|---|---|
| $r_1 = 57.2354$ | | | |
| | $d_1 = 1.0000$ | $n_1 = 1.69680$ | $v_1 = 56.49$ |
| $r_2 = 14.9589$ | | | |
| | $d_2 = D_1$ (variable) | | |
| $r_3 = 21.1928$ | | | |
| | $d_3 = 1.8046$ | $n_2 = 1.74950$ | $v_2 = 35.27$ |
| $r_4 = 127.9619$ | | | |
| | $d_4 = D_2$ (variable) | | |
| $r_5 = \infty$ (stop) | | | |
| | $d_5 = D_3$ (variable) | | |
| $r_6 = 19.4199$ | | | |
| | $d_6 = 1.5000$ | $n_3 = 1.77250$ | $v_3 = 49.66$ |
| $r_7 = -21.6105$ | | | |
| | $d_7 = 0.8000$ | | |
| $r_8 = -10.0482$ | | | |
| | $d_8 = 1.0000$ | $n_4 = 1.78470$ | $v_4 = 26.30$ |
| $r_9 = 17.8599$ | | | |
| | $d_9 = D_4$ (variable) | | |
| $r_{10} = 65.5202$ | | | |
| | $d_{10} = 2.1872$ | $n_5 = 1.78590$ | $v_5 = 44.18$ |
| $r_{11} = -10.2930$ | | | |

| f | 9.00 | 13.50 | 18.00 | (mm) |
|---|---|---|---|---|
| $D_1$ | 31.844 | 13.903 | 2.512 | |
| $D_2$ | 0.800 | 7.953 | 16.314 | |
| $D_3$ | 7.189 | 4.508 | 1.092 | |
| $D_4$ | 1.035 | 1.375 | 1.668 | |

$f_W/f_1 = -0.307$
$f_W/f_{234} = 0.531$
$HH/f_W = 3.478$
$EP/f_W = 1.830$
$v_1 = 56.49$

Embodiment 12
f = 9-18 mm, F/2.0
Maximum image height 4.2 mm, $2\omega = 50.0°-26.3°$

| | | | |
|---|---|---|---|
| $r_1 = 44.6155$ | | | |
| | $d_1 = 1.0000$ | $n_1 = 1.69680$ | $v_1 = 56.49$ |
| $r_2 = 13.8602$ | | | |
| | $d_2 = D_1$ (variable) | | |
| $r_3 = 29.1628$ | | | |
| | $d_3 = 1.8046$ | $n_2 = 1.74950$ | $v_2 = 35.27$ |
| $r_4 = -269.2950$ | | | |
| | $d_4 = D_2$ (variable) | | |
| $r_5 = \infty$ (stop) | | | |
| | $d_5 = D_3$ (variable) | | |
| $r_6 = 19.4465$ | | | |
| | $d_6 = 1.9370$ | $n_3 = 1.77250$ | $v_3 = 49.66$ |
| $r_7 = -21.8407$ | | | |
| | $d_7 = D_4$ (variable) | | |
| $r_8 = -10.0631$ | | | |
| | $d_8 = 1.0000$ | $n_4 = 1.78470$ | $v_4 = 26.30$ |
| $r_9 = 19.8031$ | | | |
| | $d_9 = 0.9077$ | | |

-continued $r_{10} = 94.3387$
$r_{11} = -10.1085$ $d_{10} = 2.1278 \quad n_5 = 1.78590 \quad \nu_5 = 44.18$

| f | 9.00 | 13.50 | 18.00 | (mm) |
|---|---|---|---|---|
| $D_1$ | 30.698 | 13.683 | 2.576 | |
| $D_2$ | 0.800 | 8.499 | 14.346 | |
| $D_3$ | 6.415 | 4.602 | 2.522 | |
| $D_4$ | 0.800 | 1.248 | 2.246 | |

$f_W/f_1 = -0.308$
$f_W/f_{234} = 0.547$
$HH/f_W = 3.352$
$EP/f_W = 1.803$
$\nu_1 = 56.49$

Embodiment 13
f = 8–16, F/2.8
Maximum image height 4.2, $2\omega = 55.4°–29.4°$ $r_1 = 102.6593$
  $d_1 = 1.0000 \quad n_1 = 1.54771 \quad \nu_1 = 62.83$
$r_2 = 12.2064$
  $d_2 = D_1$ (variable)
$r_3 = 24.4554$
  $d_3 = 2.0937 \quad n_2 = 1.69680 \quad \nu_2 = 55.52$
$r_4 = -41.7224$
  $d_4 = D_2$ (variable)
$r_5 = \infty$ (stop)
  $d_5 = D_3$ (variable)
$r_6 = -6.3847$
  $d_6 = 0.9000 \quad n_3 = 1.78472 \quad \nu_3 = 25.68$
$r_7 = -46.2820$
  $d_7 = D_4$ (variable)
$r_8 = 32.9816$
  $d_8 = 1.5804 \quad n_4 = 1.77250 \quad \nu_4 = 49.66$
$r_9 = -7.0263$
(aspherical surface)

aspherical coefficient
9th surface $A_4 = 0.34472 \times 10^{-3}$, $A_6 = 0.87251 \times 10^{-5}$
$A_8 = -0.63995 \times 10^{-7}$

| f | 8.00 | 12.00 | 16.01 | (mm) |
|---|---|---|---|---|
| $D_1$ | 28.223 | 16.488 | 2.082 | |
| $D_2$ | 1.000 | 8.147 | 8.407 | |
| $D_3$ | 5.896 | 5.379 | 1.200 | |
| $D_4$ | 0.203 | 0.220 | 0.810 | |

$f_W/f_1 = -0.315$
$f_W/f_{234} = 0.535$
$HH/f_W = 3.420$
$EP/f_W = 1.825$
$\nu_1 = 62.83$ wherein the reference symbols $r_1, r_2, \ldots$ represent radii of curvature on the surfaces of the respective lens elements, the reference symbols $d_i, d_2, \ldots$ designate thicknesses of the respective lens elements and airspaces reserved therebetween, the reference symbols $n_1, n_2, \ldots$ denote refractive indices of the respective lens elements and the reference symbols $\nu_1, \nu_2, \ldots$ represent Abbe's numbers of the respective lens elements.

The Embodiment 1 has the composition illustrated in FIG. 1 wherein the front lens unit consists of a negative lens element and a positive lens element, whereas the rear lens unit consists of a positive lens element, a negative lens element and a positive lens element. Polycarbonate is supposed as the material of the positive lens element arranged in the front lens unit in the Embodiment 1. This material exhibits a high extraordinarily dispersing property, and has refractive indices of 1.57763, 1.59678 and 1.6084 for the C-line, F-line and g-line respectively.

Figure 14:
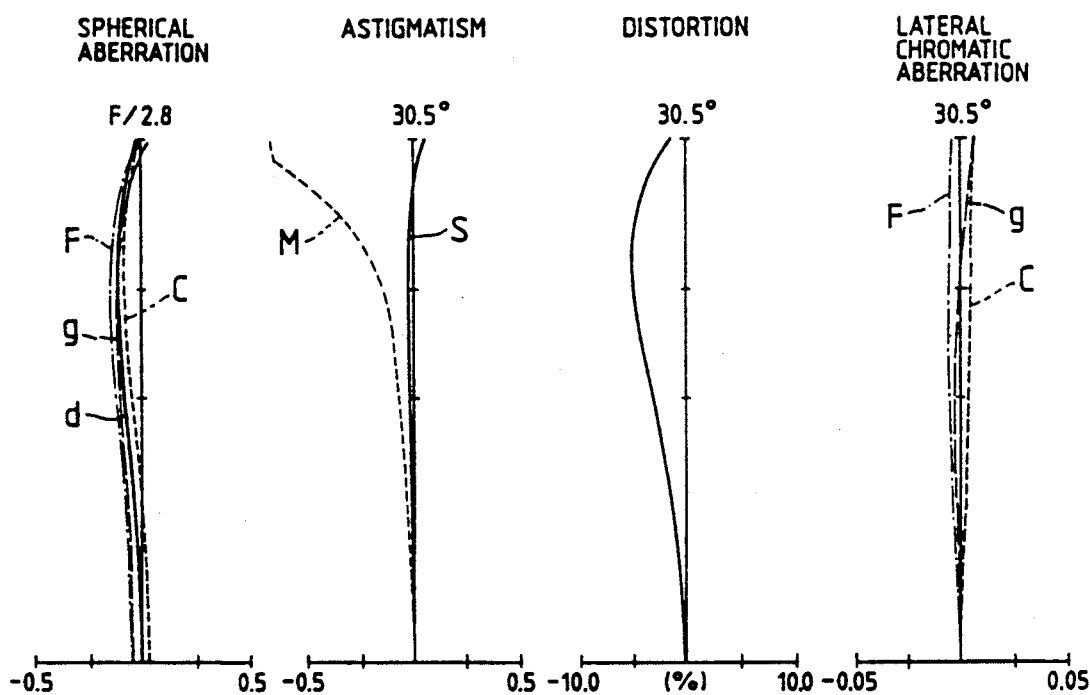
FIG. 14 through FIG. 16 show curves illustrating aberration characteristics of the Embodiment 1 of the present invention.
Figure 15:
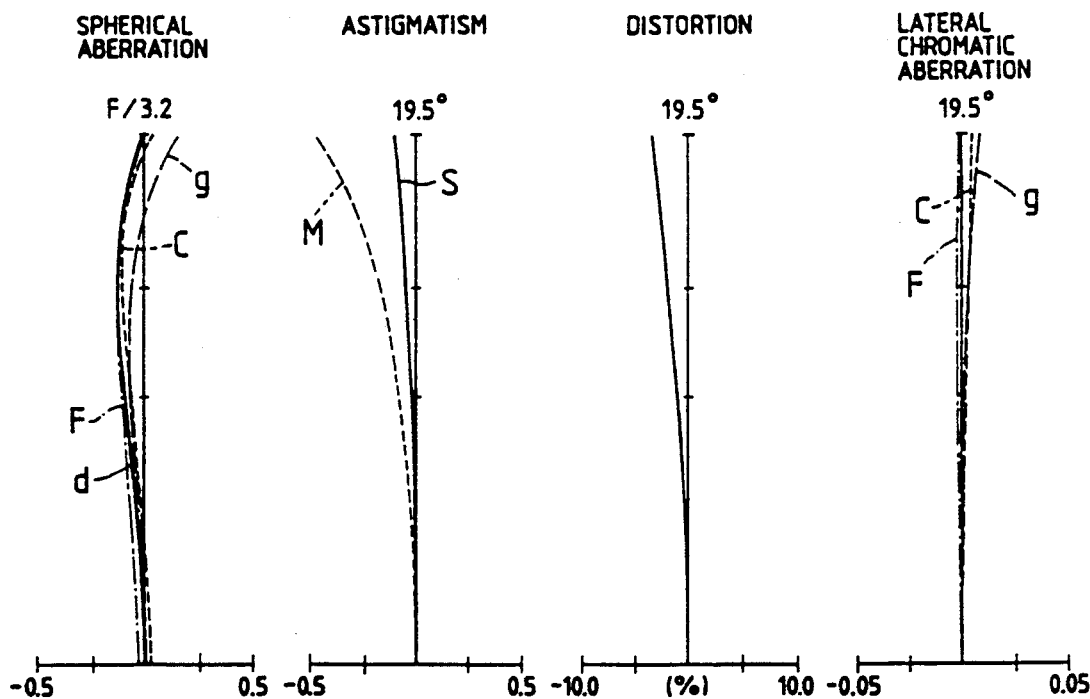
Figure 16:
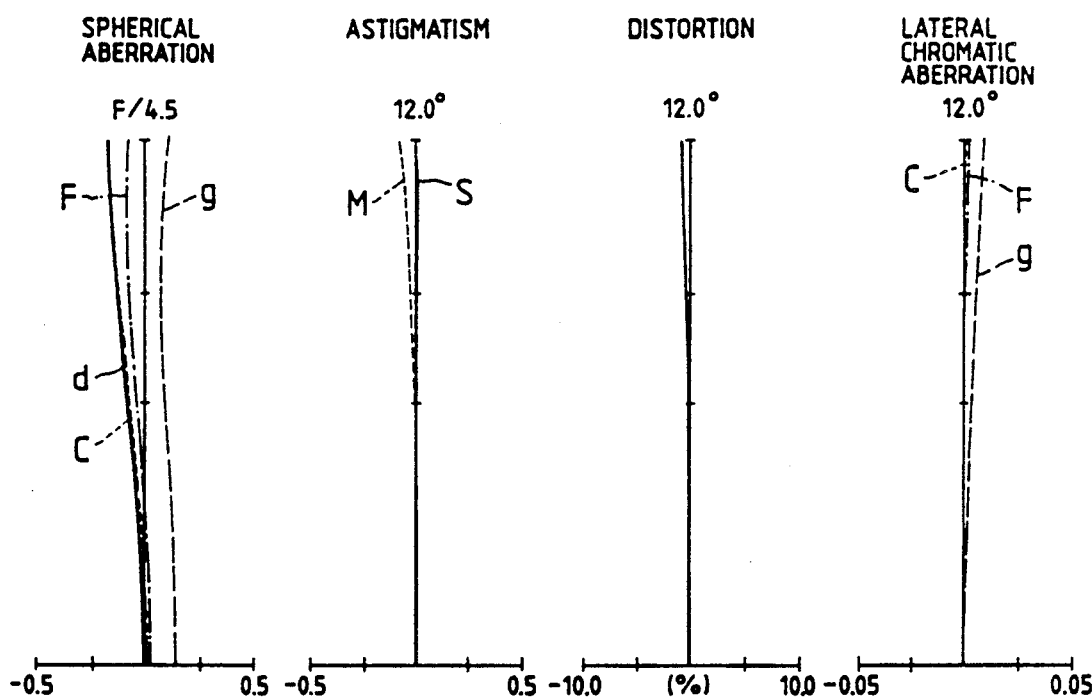

Aberration characteristics at the wide position, intermediate focal length and tele position of the Embodiment 1 for an object located at infinite distance are illustrated in FIG. 14, FIG. 15 and FIG. 16 respectively.

Figure 2:
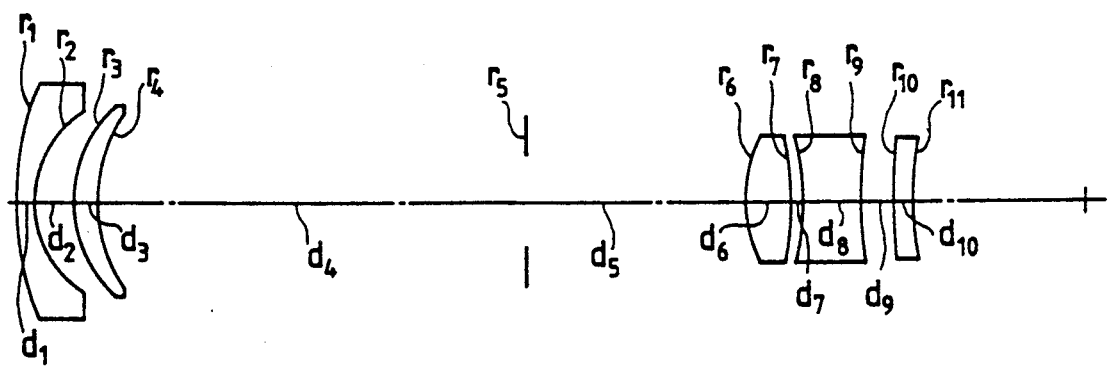
Figure 2:
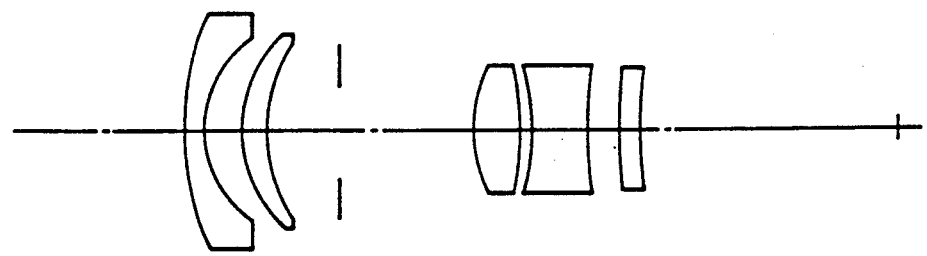
Figure 2:
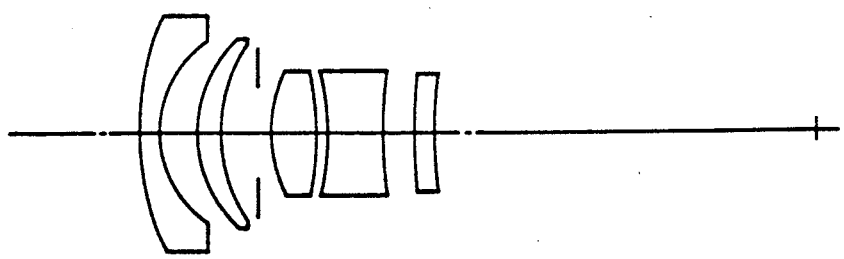
Figure 17:
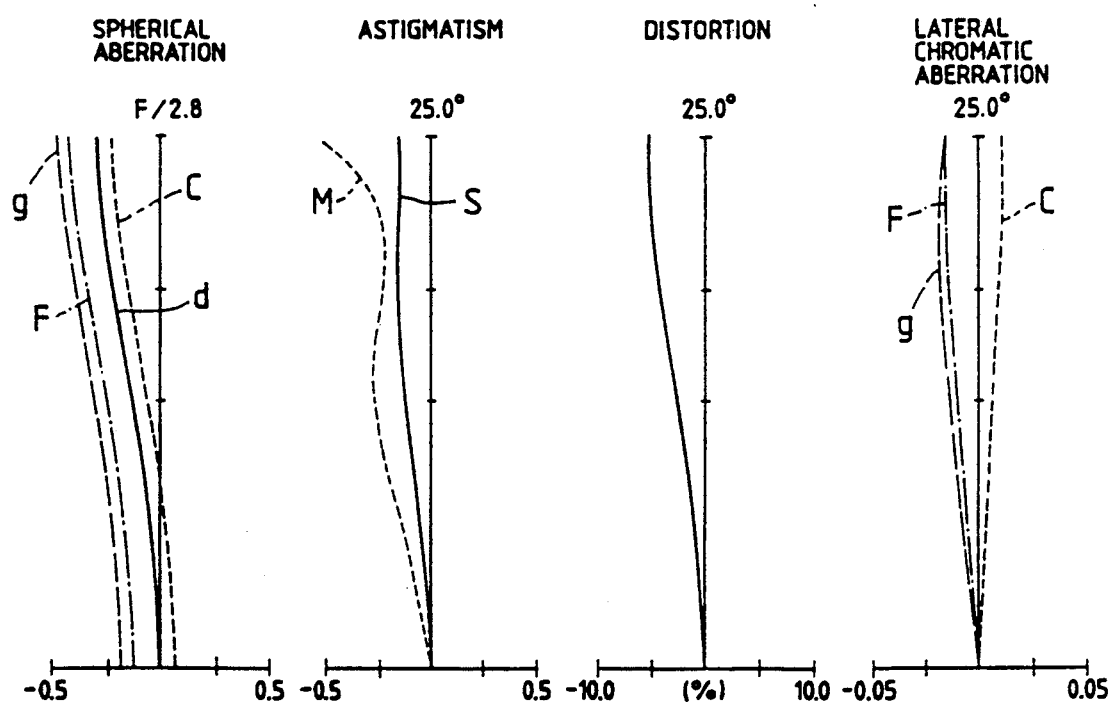
FIG. 17 through FIG. 19 show curves illustrating aberration characteristics of the Embodiment 2 of the present invention.
Figure 18:
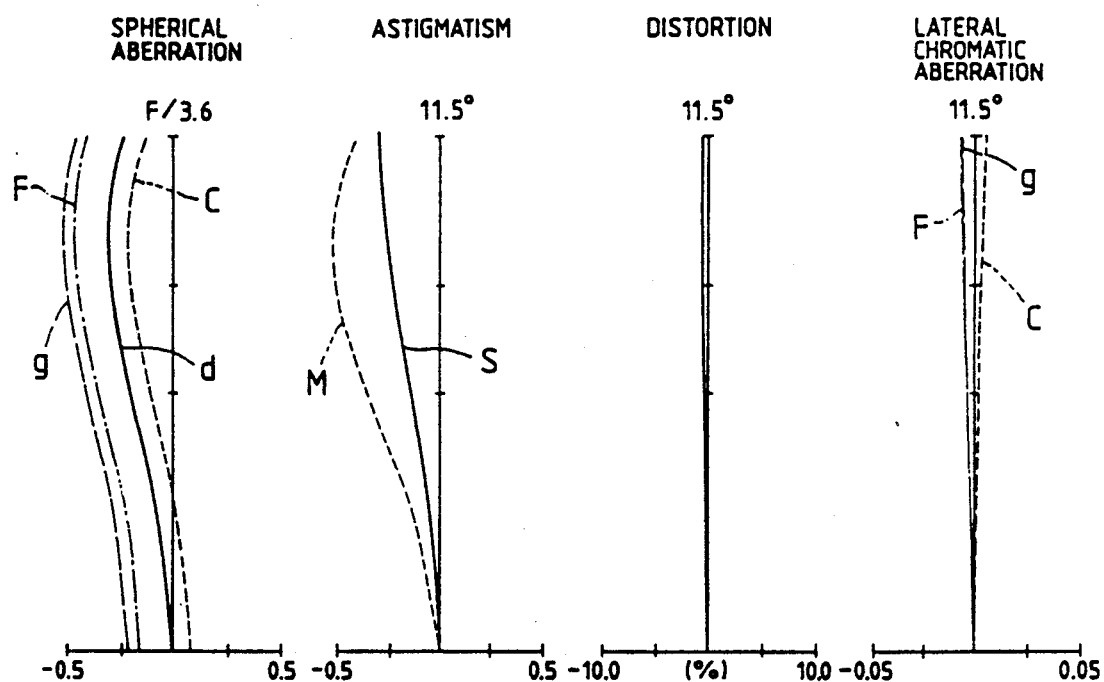
Figure 19:
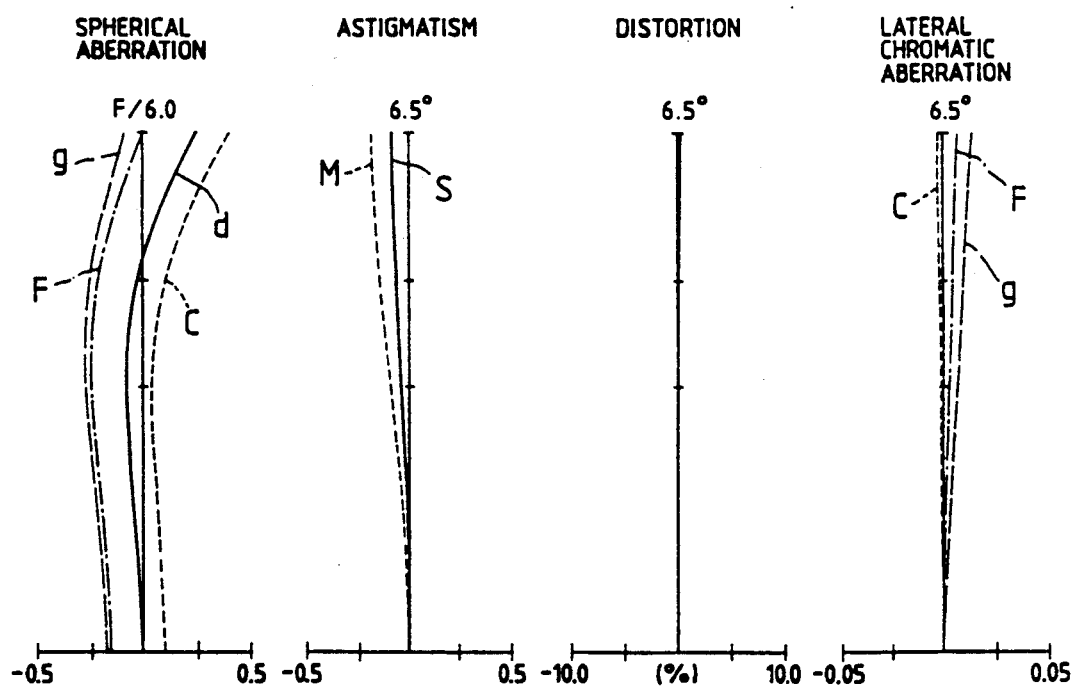

The Embodiment 2 has the composition illustrated in FIG. 2 wherein the front lens unit consists of a negative lens element and a positive lens element, whereas the rear lens unit consists of a positive lens element, a negative lens element and a positive lens element. Aberration characteristics of the Embodiment 2 at the wide position, intermediate focal length and tele position are visualized in FIG. 17, FIG. 18 and FIG. 19 respectively.

Figure 3:
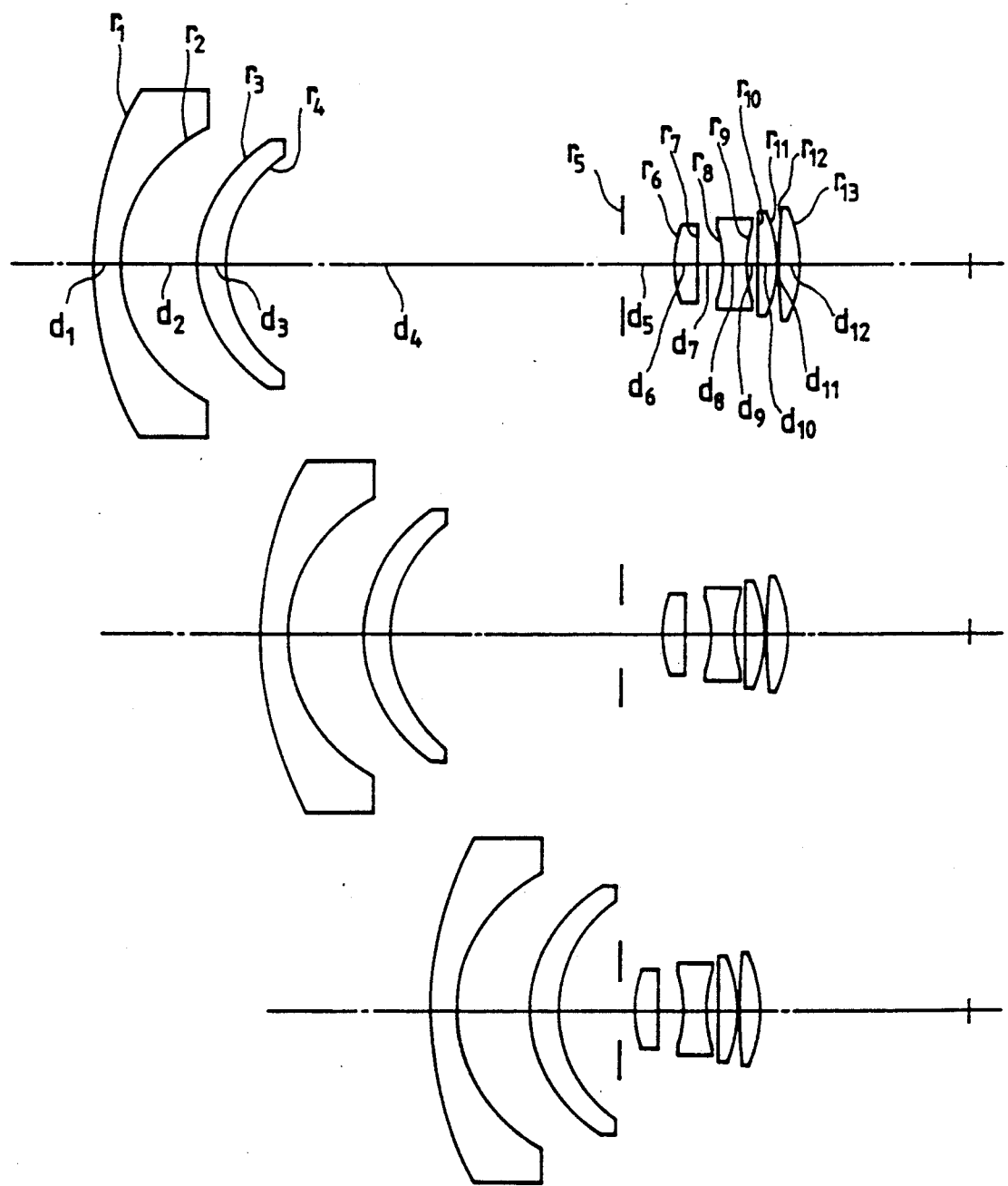

The Embodiment 3 has the composition shown in FIG. 3 wherein the front lens unit consists of a negative lens element and a positive lens element, whereas the rear lens unit consists of a positive lens element, a negative lens element, a positive lens element and a positive lens element.

Figure 20:
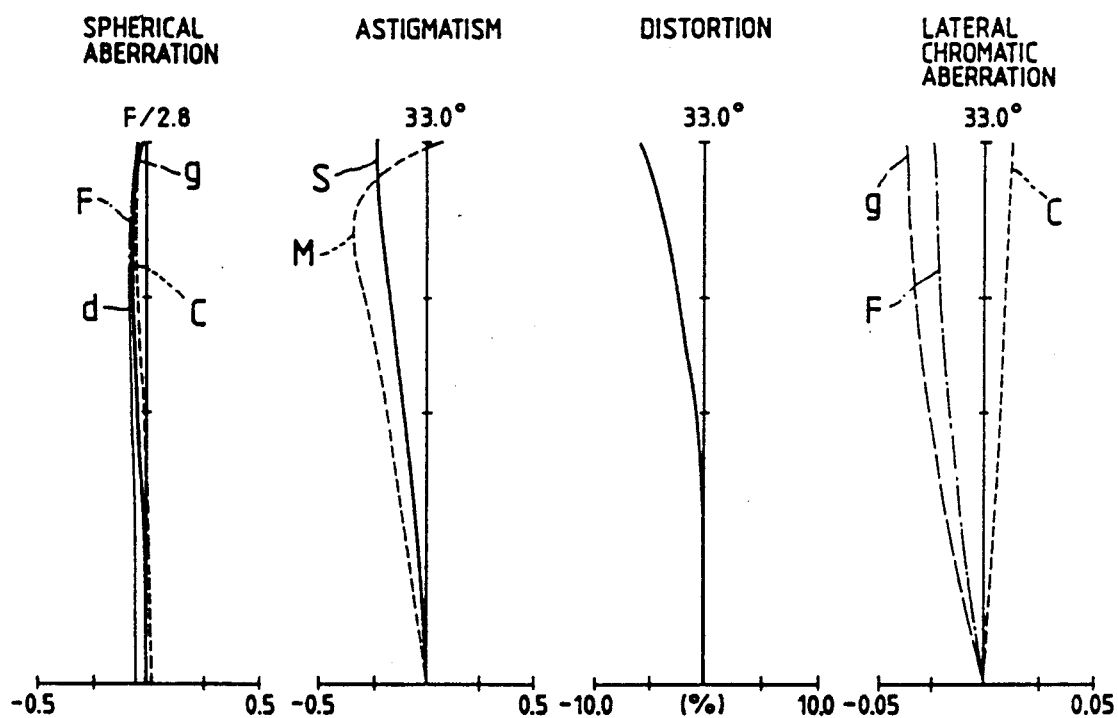
FIG. 20 through FIG. 22 show curves illustrating aberration characteristics of the Embodiment 3 of the present invention.
Figure 21:
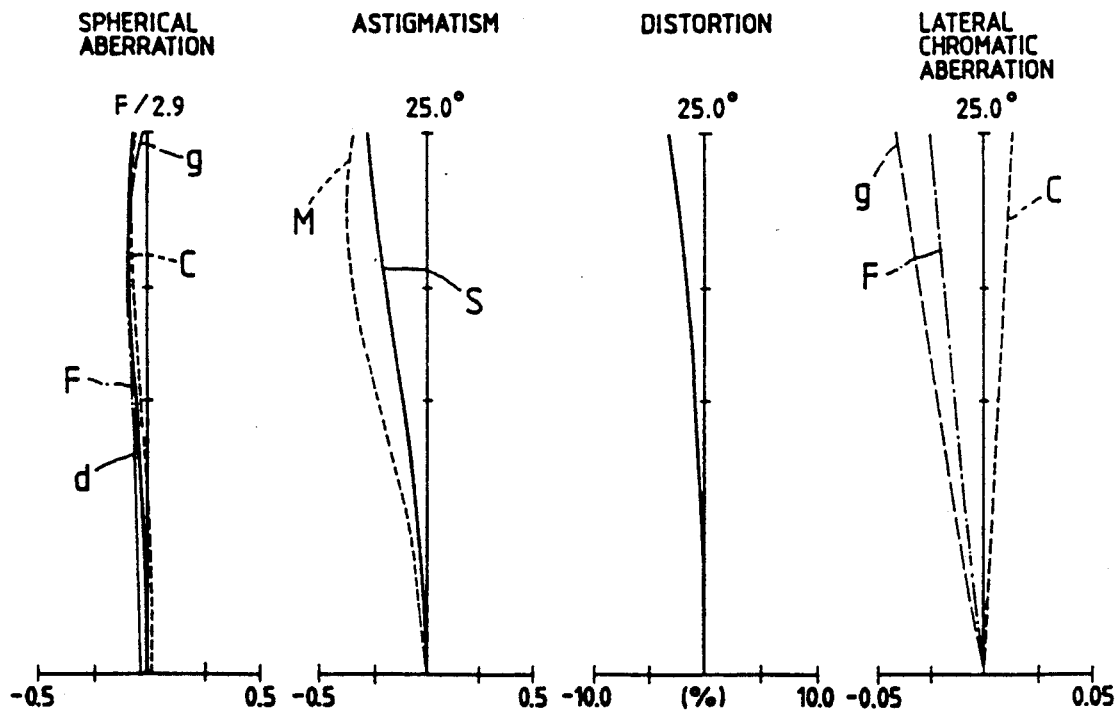
Figure 22:
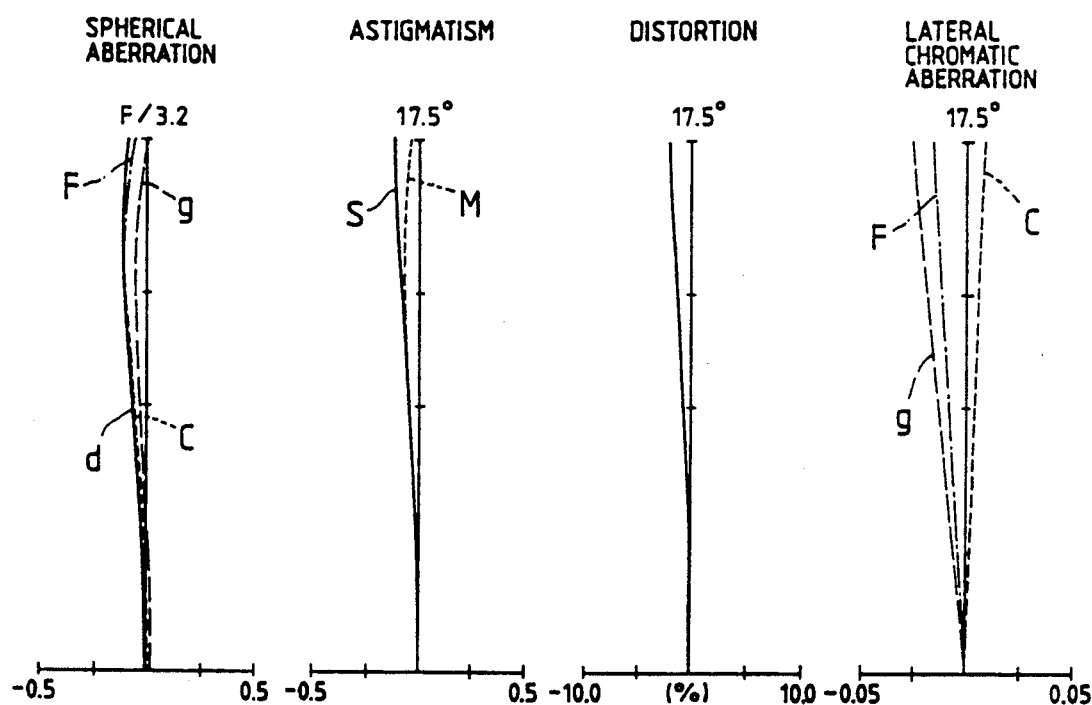

Aberration characteristics at the wide position, intermediate focal length and tele position of the Embodiment 3 for an object located at infinite distance are illustrated in FIG. 20, FIG. 21 and FIG. 22 respectively.

Figure 4:
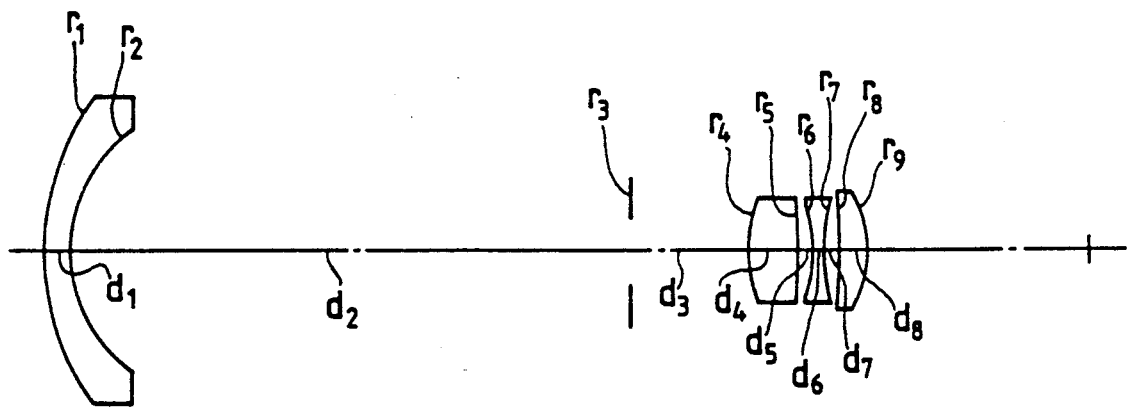
Figure 4:
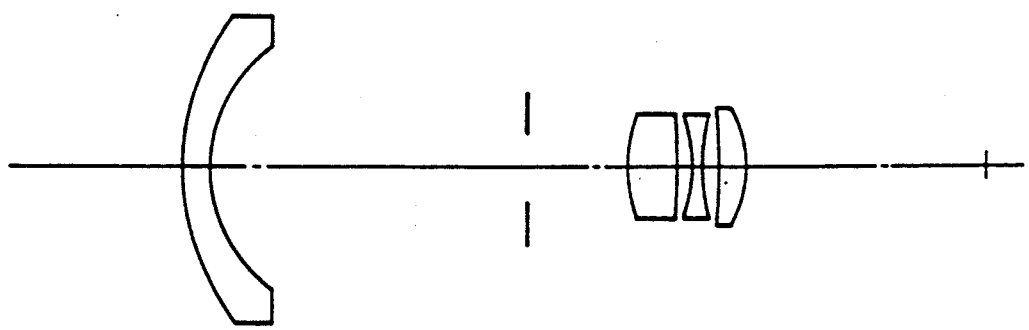
Figure 4:
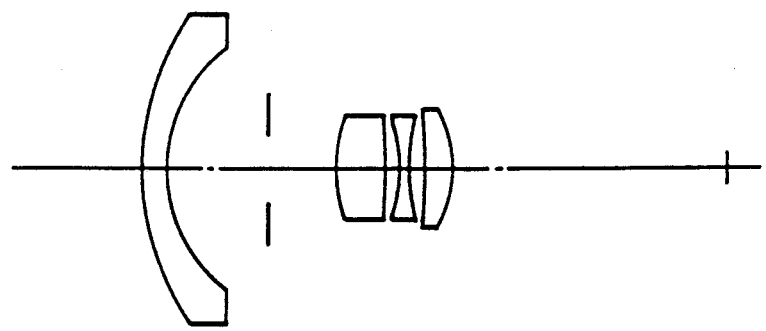

The Embodiment 4 has the composition shown in FIG. 4 wherein the front lens unit consists of a single negative lens element, whereas the rear lens unit consists of a positive lens element, a negative lens element and a positive lens element.

Figure 23:
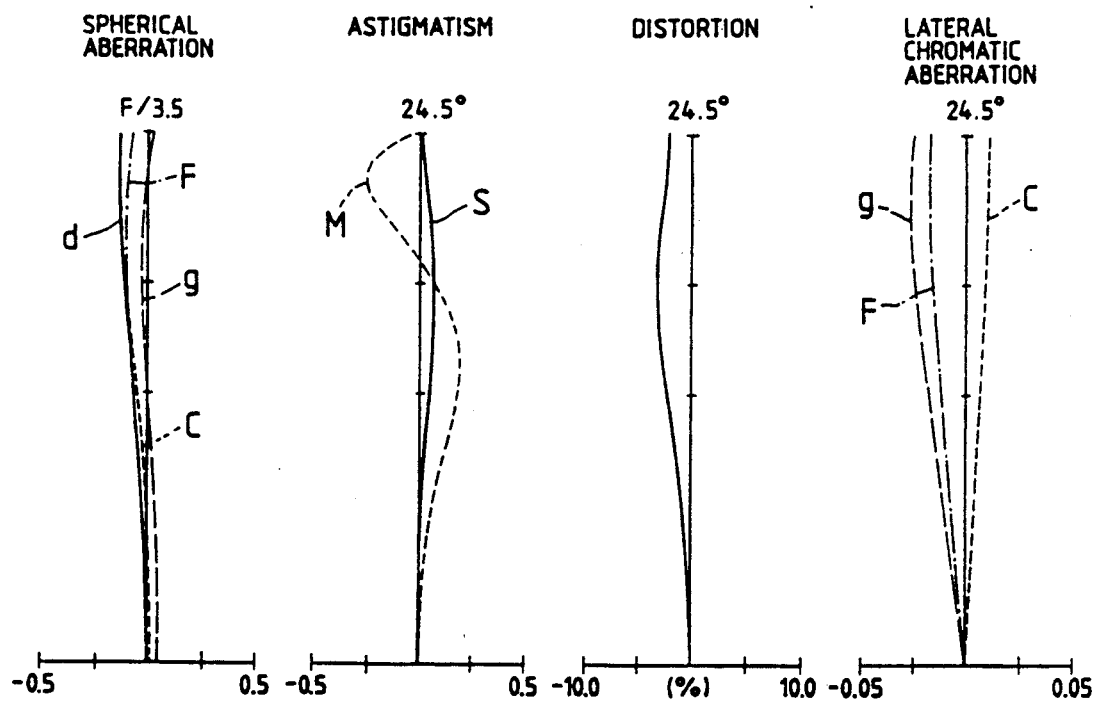
FIG. 23 through FIG. 25 show graphs illustrating aberration characteristics of the Embodiment 4 of the present invention.
Figure 24:
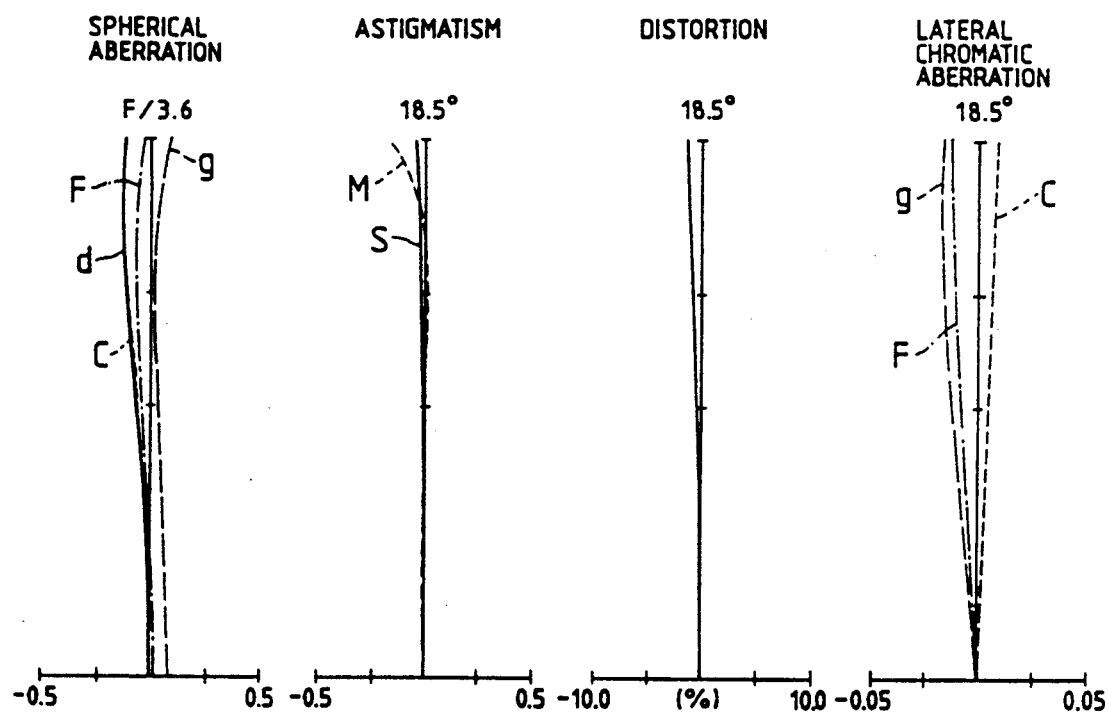
Figure 25:
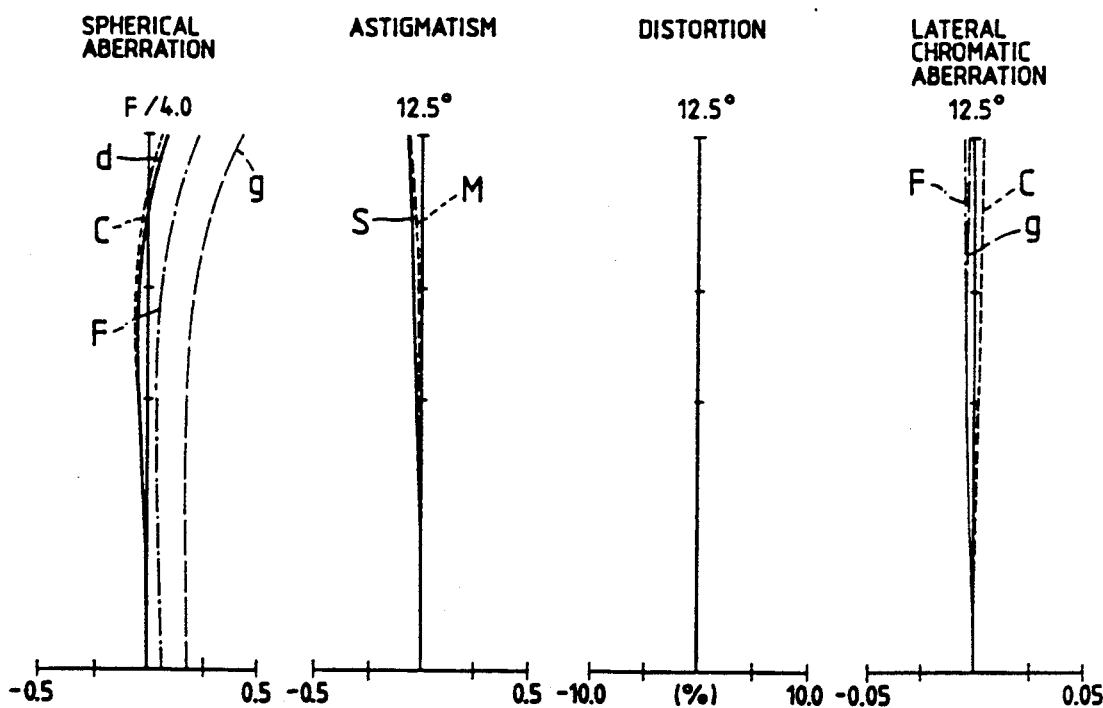

Aberration characteristics at the wide position, intermediate focal length and tele position of the Embodiment 4 for an object located at infinite distance are visualized in FIG. 23, FIG. 24 and FIG. 25 respectively.

Figure 5:
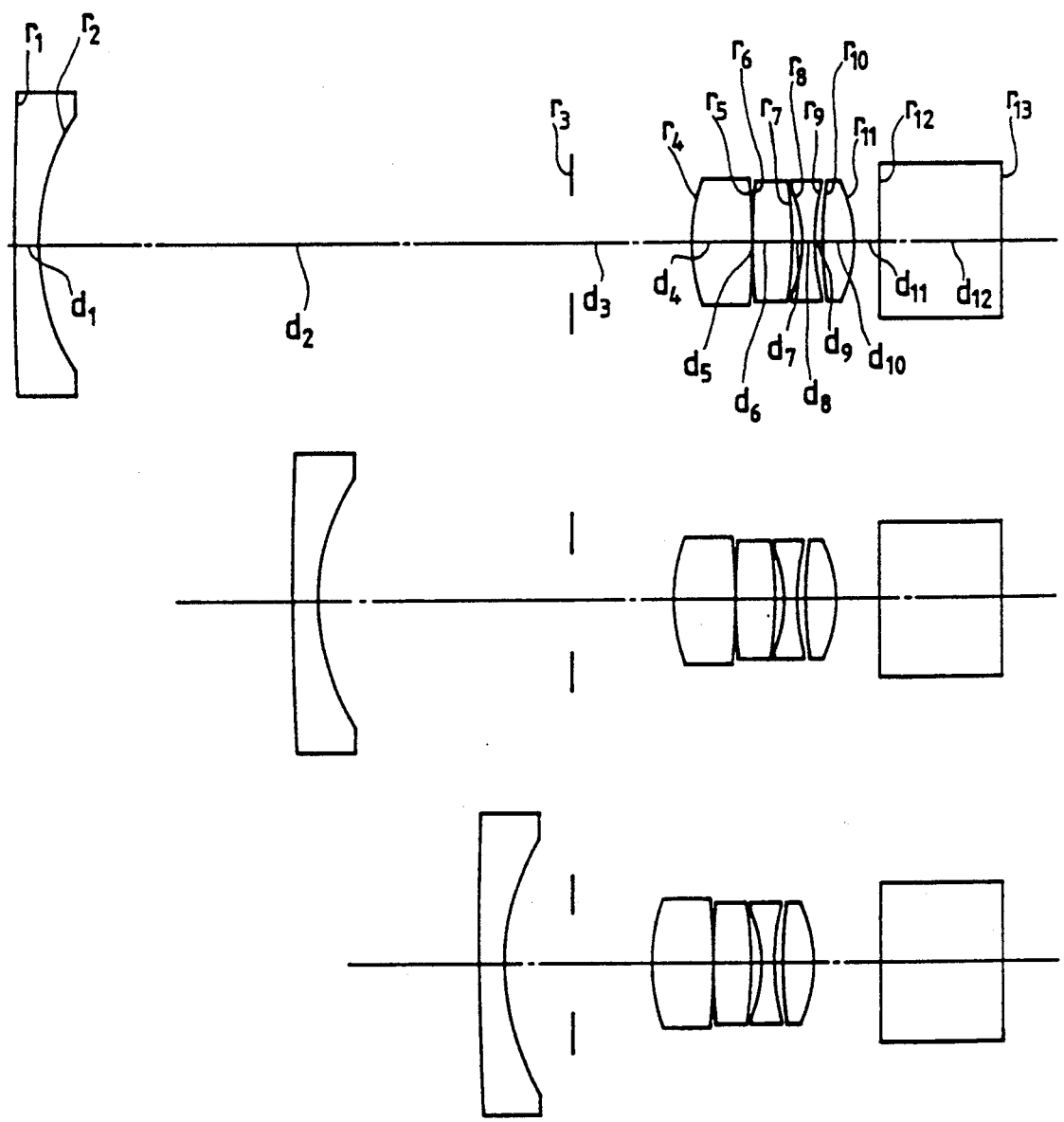

The Embodiment 5 has the composition illustrated in FIG. 5 wherein the front lens unit consists of a single negative lens element, whereas the rear lens unit consists of a positive lens element, a positive lens element, a negative lens element and a positive lens element. The glass block arranged after the lens system is supposed to be composed of optical members such as an optical path splitting mirror and a low pass filter made of quartz for leading rays to a viewfinder.

Figure 26:
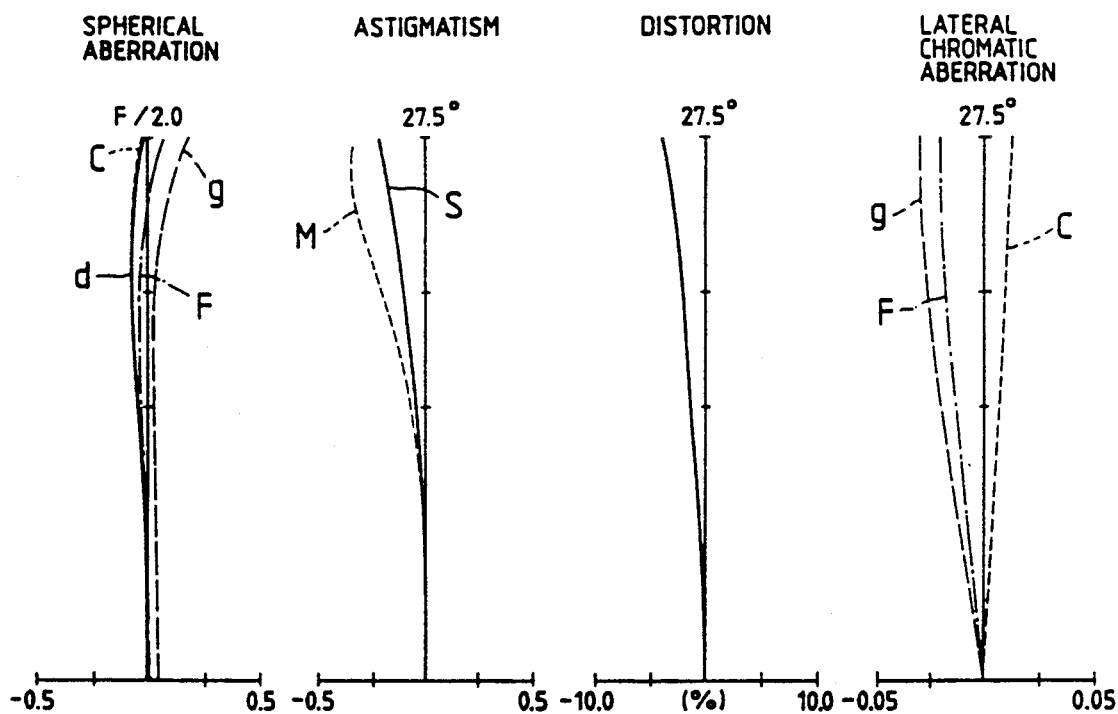
FIG. 26 through FIG. 28 show graphs visualizing aberration characteristics of the Embodiment 5 of the present invention.
Figure 27:
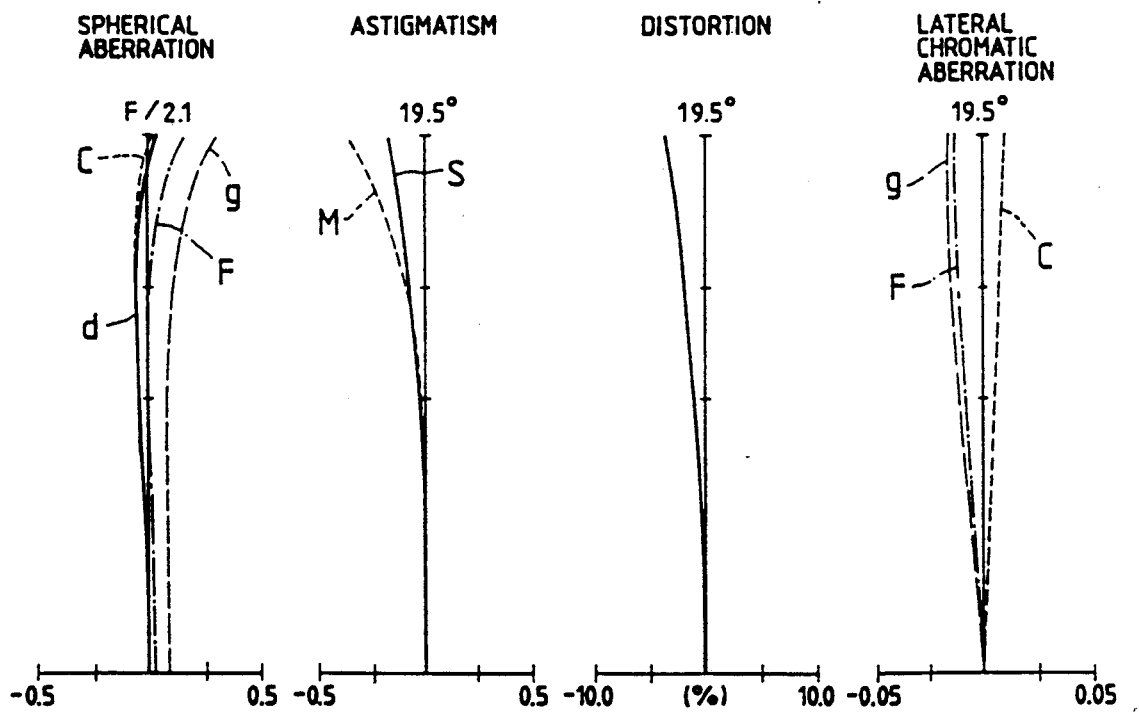
Figure 28:
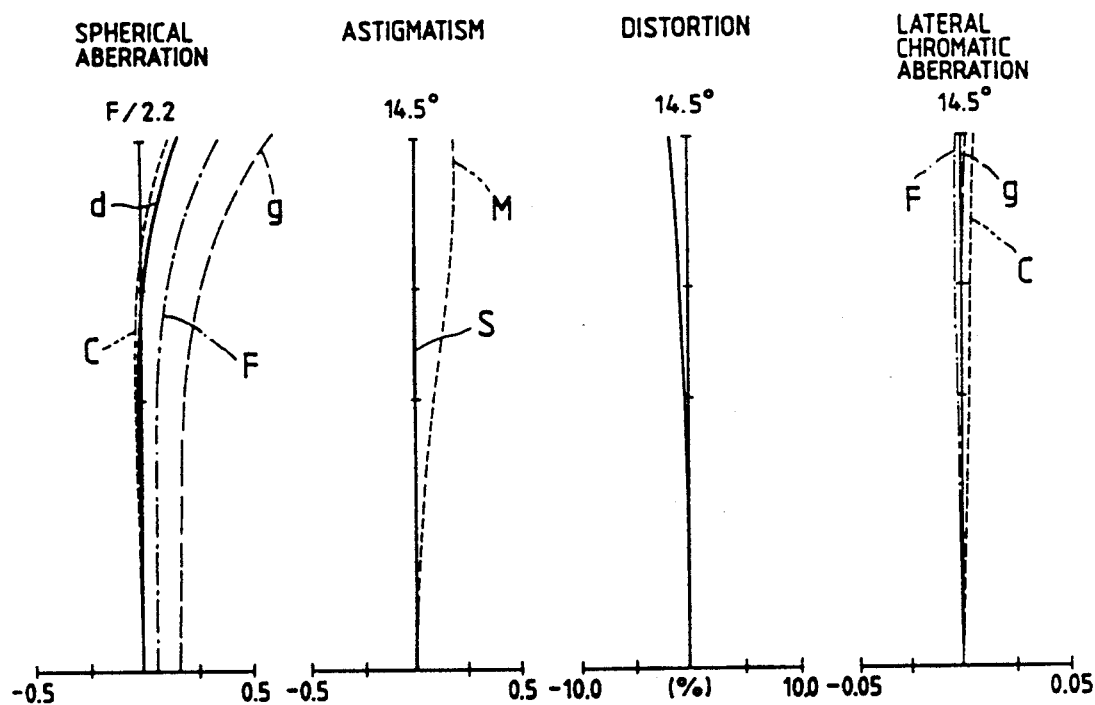

Aberration characteristics at the wide position, intermediate focal length and tele position of the Embodiment 5 are shown in FIG. 26, FIG. 27 and FIG. 28 respectively.

Figure 6:
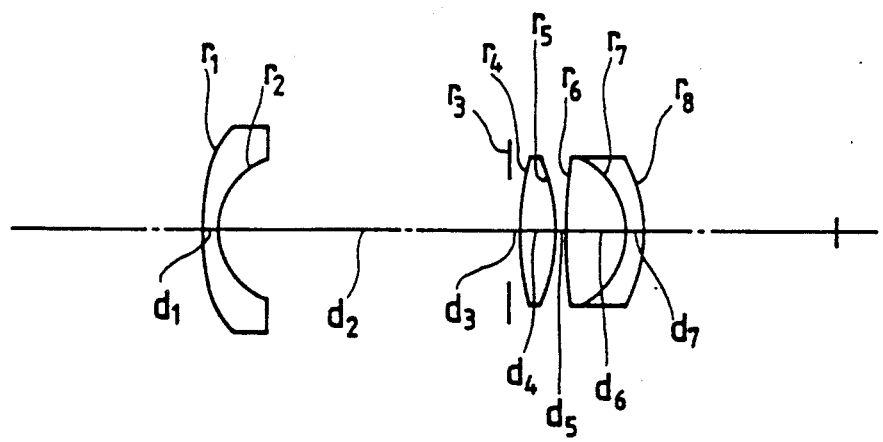
Figure 6:
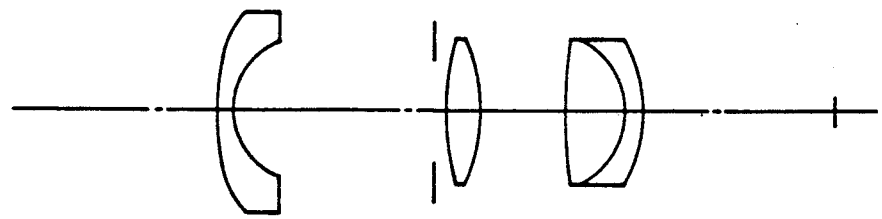
Figure 6:
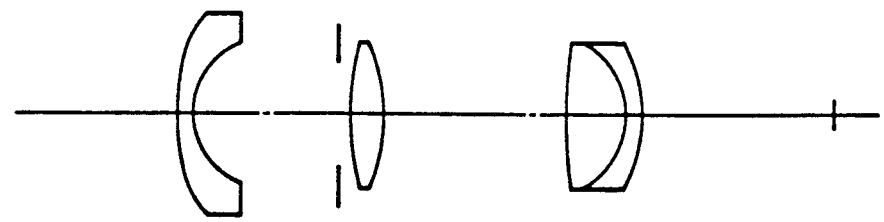

The Embodiments 6 through 10 have a common composition wherein the front lens unit is divided into a first subunit and a second subunit, or the rear lens unit is divided into a subunit 1F and a subunit 1R. The Embodiment 6 has the composition illustrated in FIG. 6 wherein the front lens unit consists of a single negative lens element, the subunit 1F consists of a single positive lens element, and the subunit 1R comprises a cemented doublet consisting of a positive lens element and a negative lens element.

Figure 29:
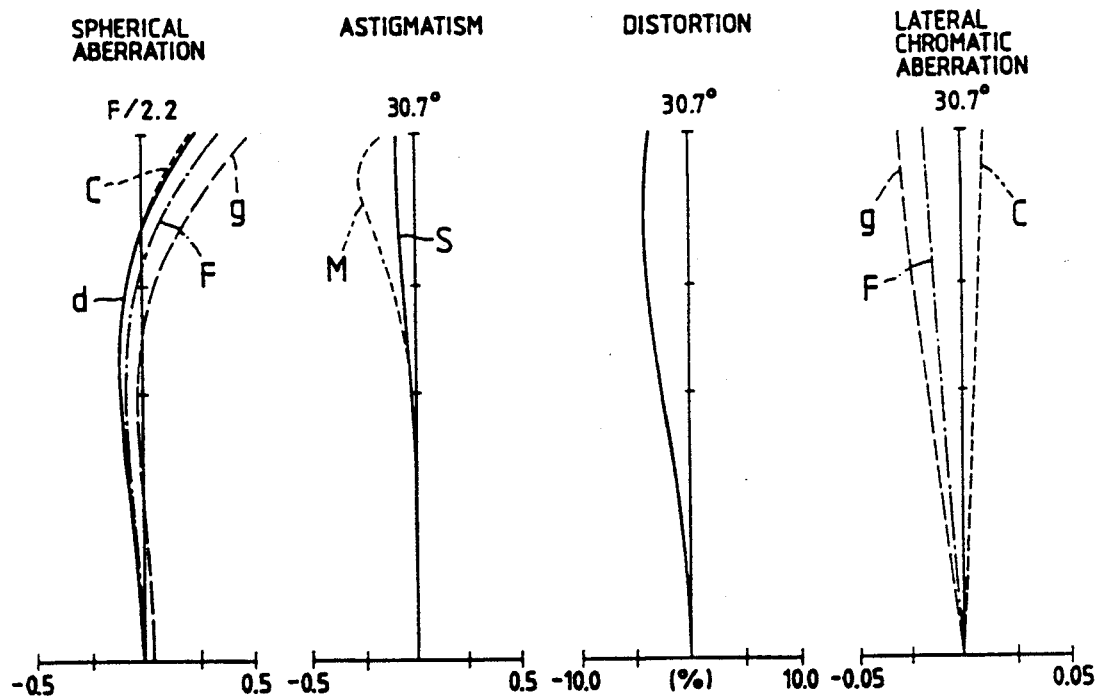
FIG. 29 through FIG. 31 show graphs visualizing aberration characteristics of the Embodiment 6 of the present invention.
Figure 30:
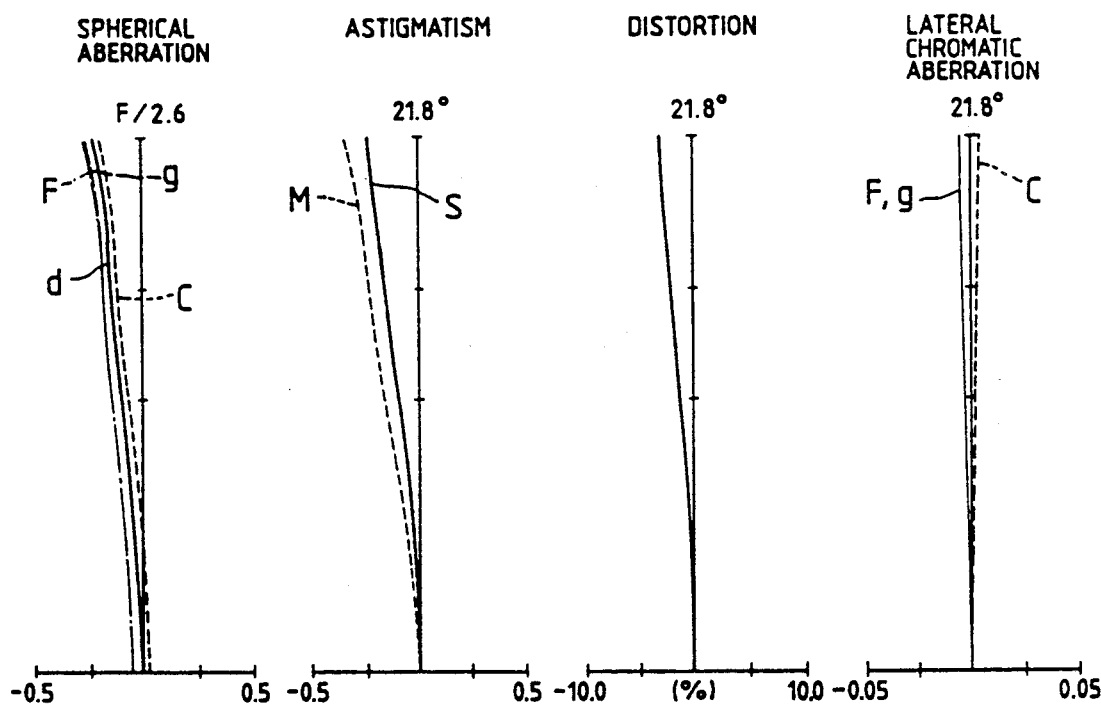
Figure 31:
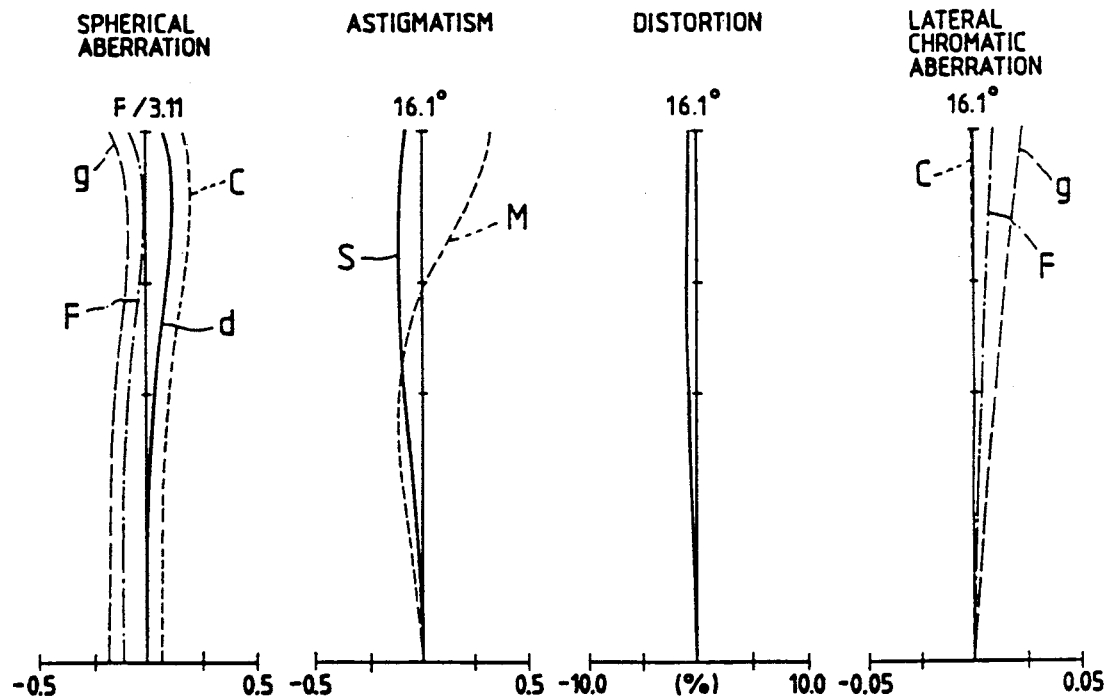

Aberration characteristics at the wide position, intermediate focal length and tele position of the Embodiment 6 for an object located at infinite distance are illustrated in FIG. 29, FIG. 30 and FIG. 31 respectively.

Figure 7:
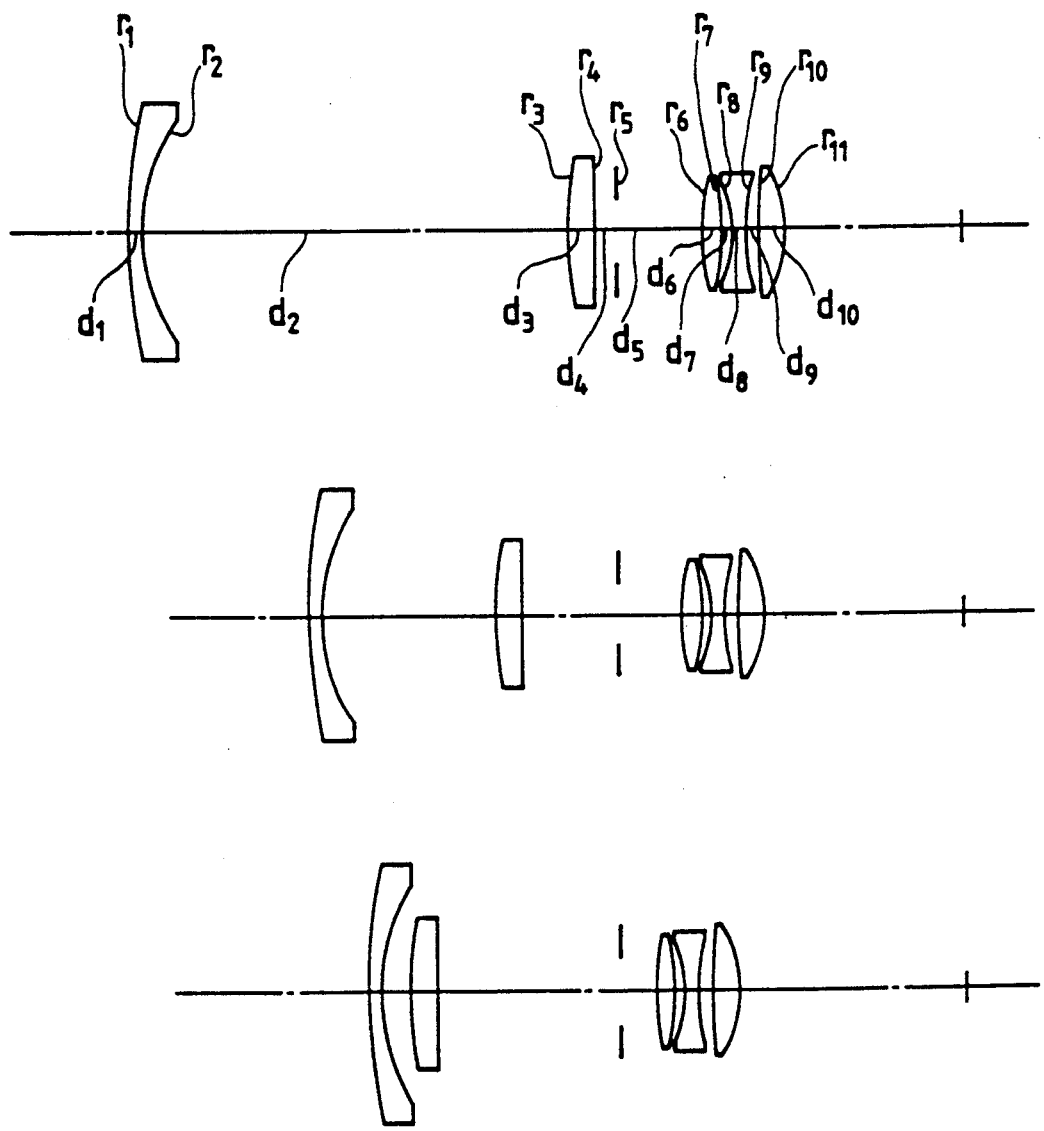

The Embodiment 7 has the composition shown in FIG. 7 wherein the first subunit of the front lens unit consists of a single negative lens element, the second subunit consists of a single positive lens element, and the rear lens unit consists of a positive lens element, a negative lens element and a positive lens element. Further, an aspherical surface is used as the extremely image side surface in the rear lens unit.

Figure 32:
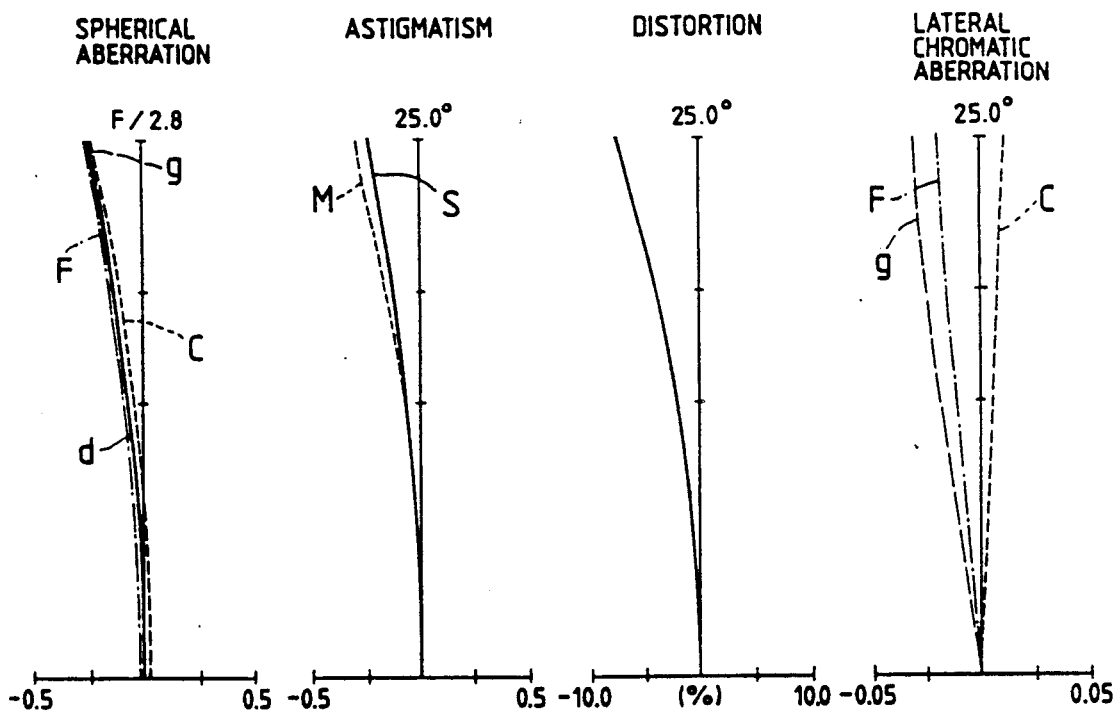
FIG. 32 through FIG. 34 show curves illustrating aberration characteristics of the Embodiment 7 of the present invention.
Figure 33:
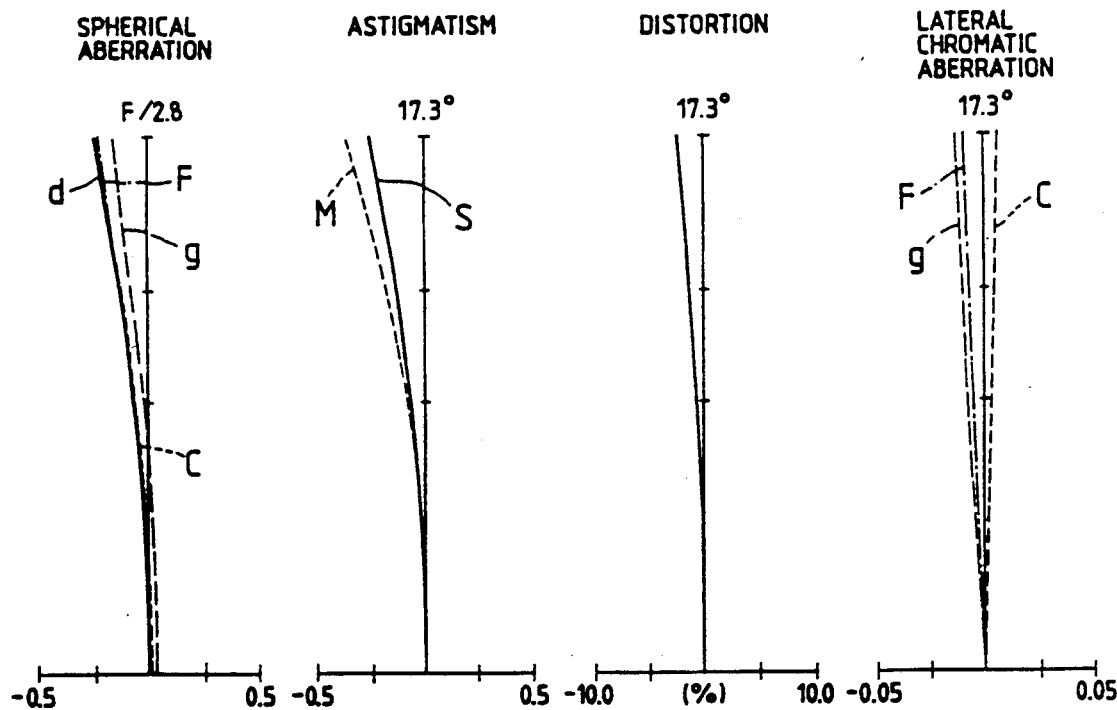
Figure 34:
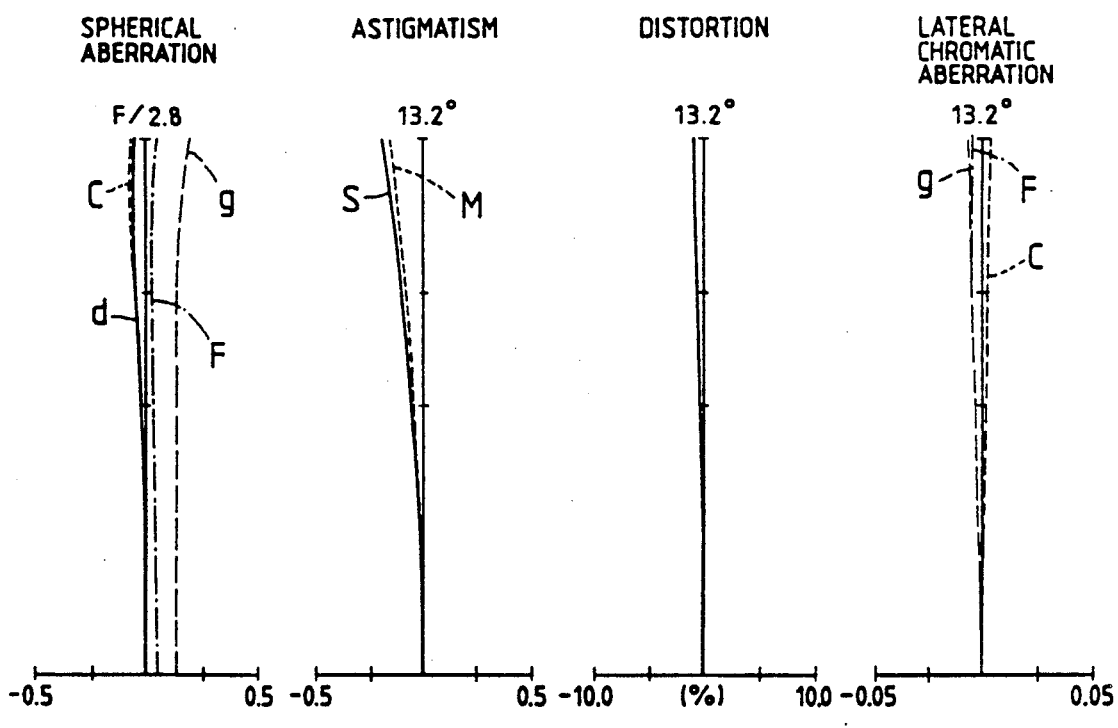

Aberration characteristics at the wide position, intermediate focal length and tele position of the Embodiment 7 for an object located at infinite distance are illustrated in FIG. 32, FIG. 33 and FIG. 34 respectively.

Figure 8:
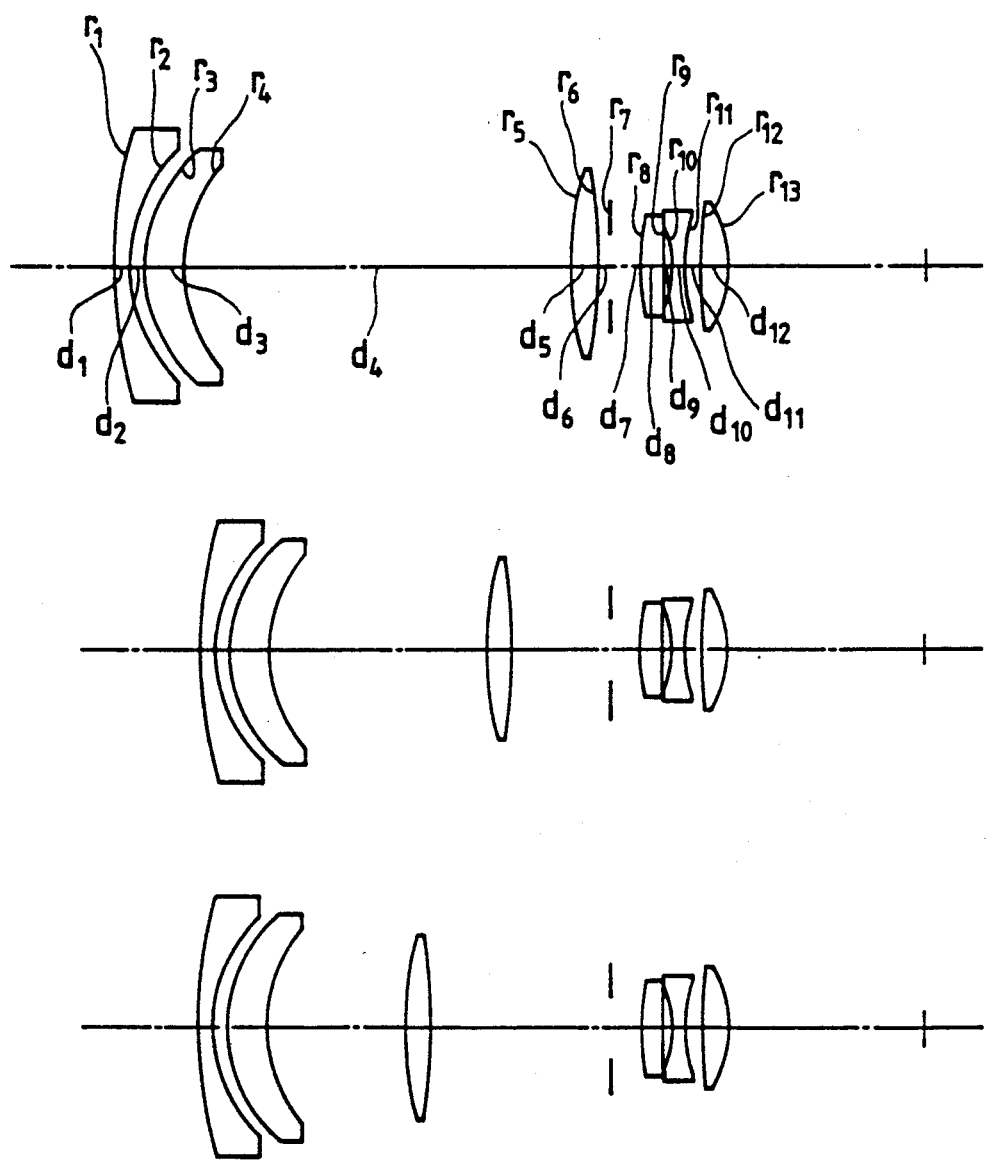
Figure 35:
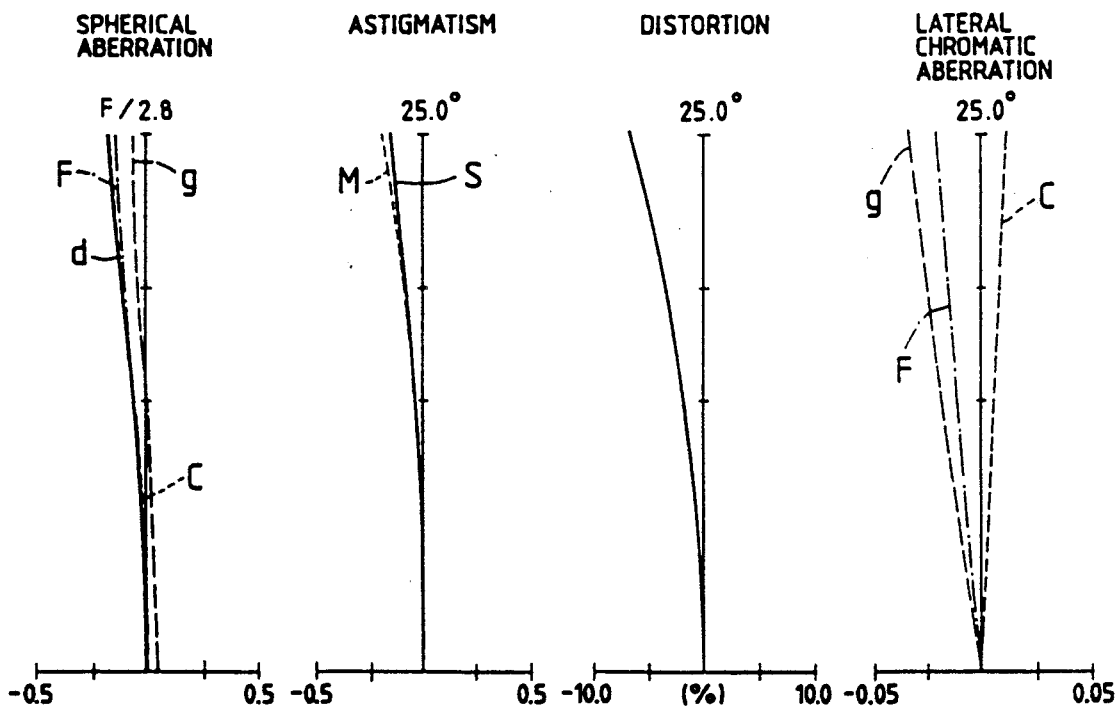
FIG. 35 through FIG. 37 show curves visualizing aberration characteristics of the Embodiment 8 of the present invention.
Figure 36:
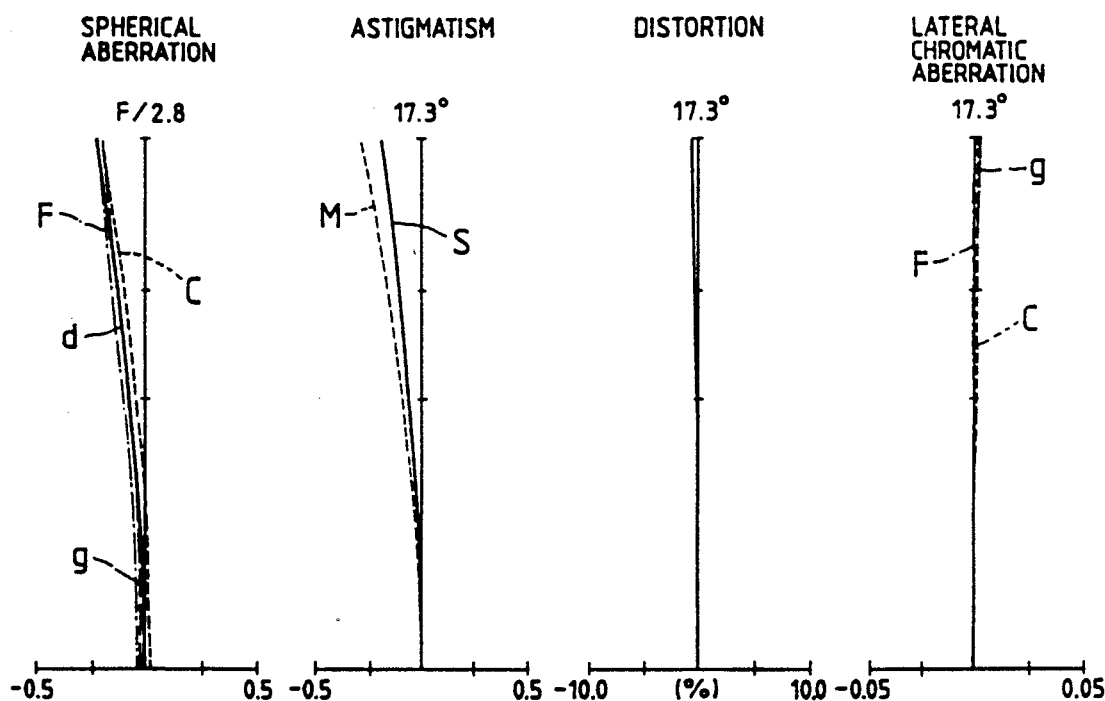
Figure 37:
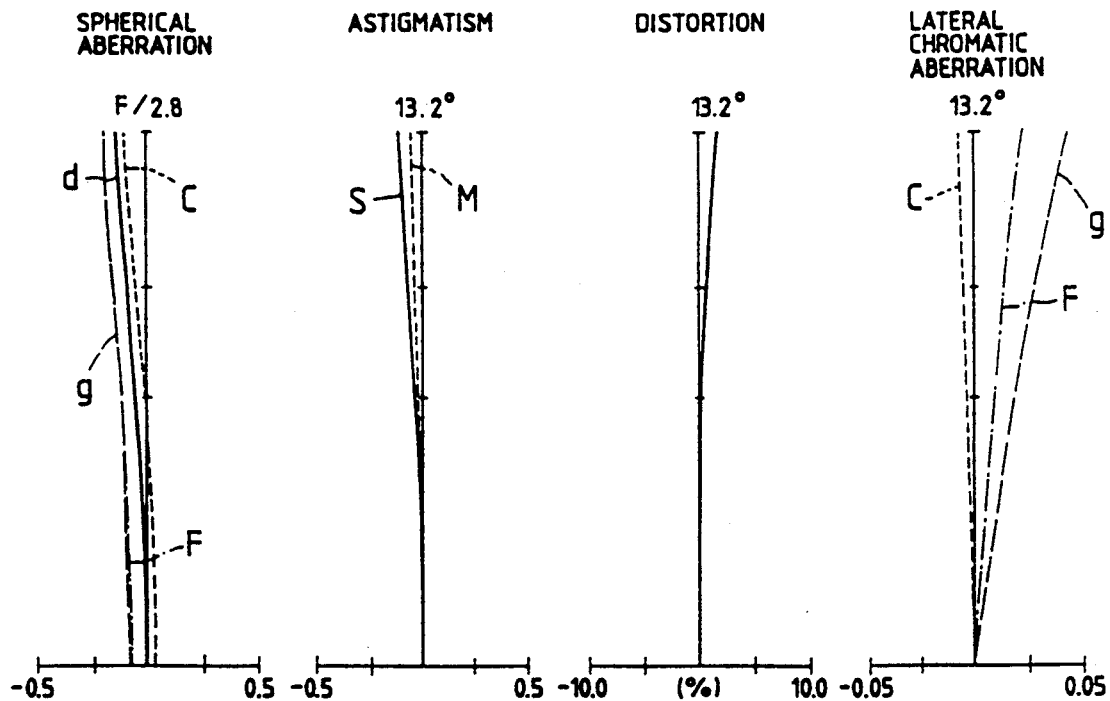

The Embodiment 8 has the composition shown in FIG. 8 wherein the first subunit consists of a negative lens element and a positive lens element, the second subunit consists of a single positive lens element, and the rear lens unit consists of a positive lens element, a negative lens element and a positive lens element. The lens system preferred a the Embodiment 8 is designed in such a manner that the stop and the rear lens unit are kept fixed during variation of focal length Aberration characteristics at the wide position, intermediate focal length and tele position of the Embodiment 8 for an object located at infinite distance are visualized in FIG. 35, FIG. 36 and FIG. 37 respectively.

Figure 9:
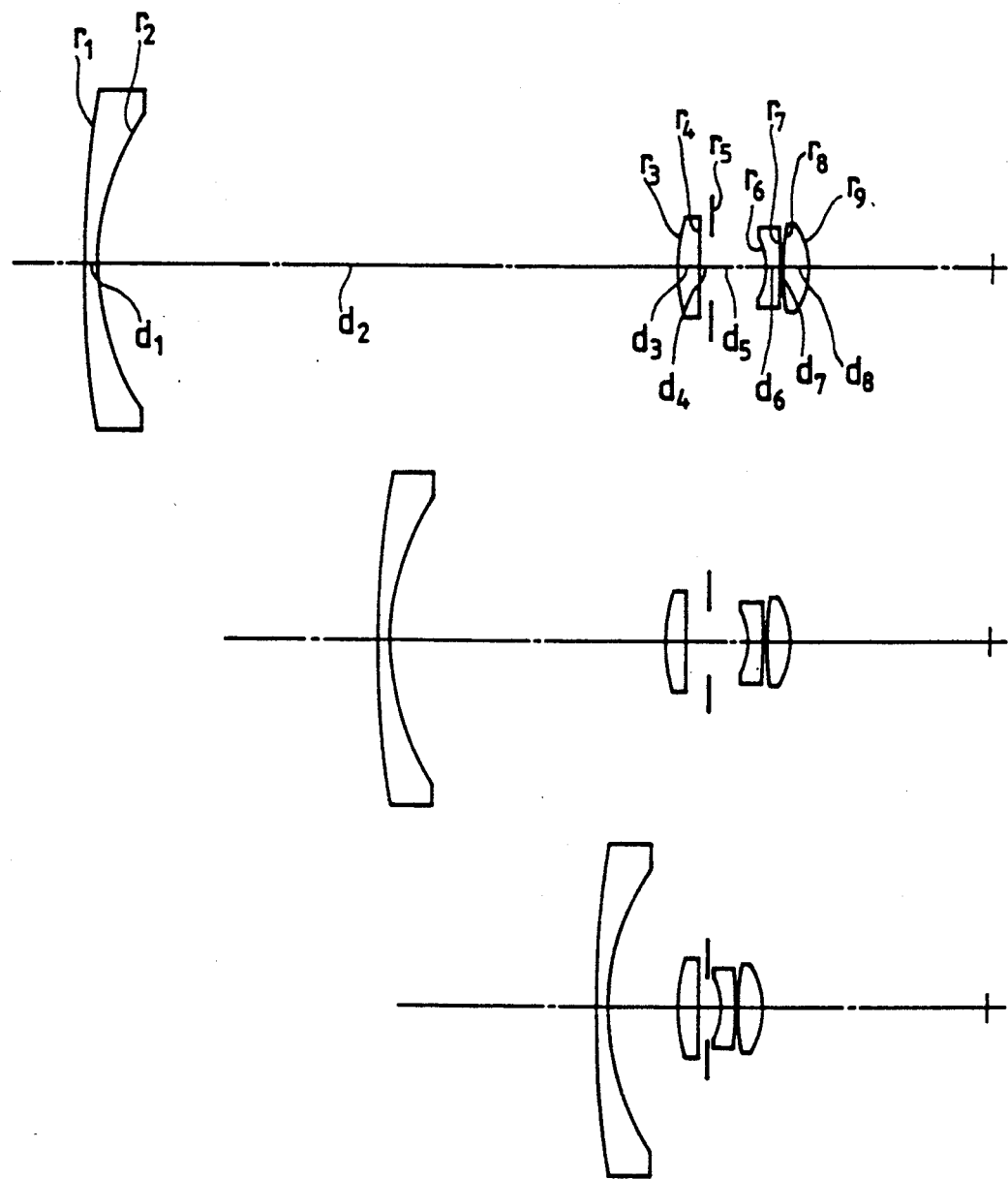

The Embodiment 9 has the composition shown in FIG. 9 which is similar to that of the Embodiment 1. However, the Embodiment 9 adopts aspherical surfaces as the object side surface of the first subunit and extremely image side surface in the rear lens unit.

Figure 38:
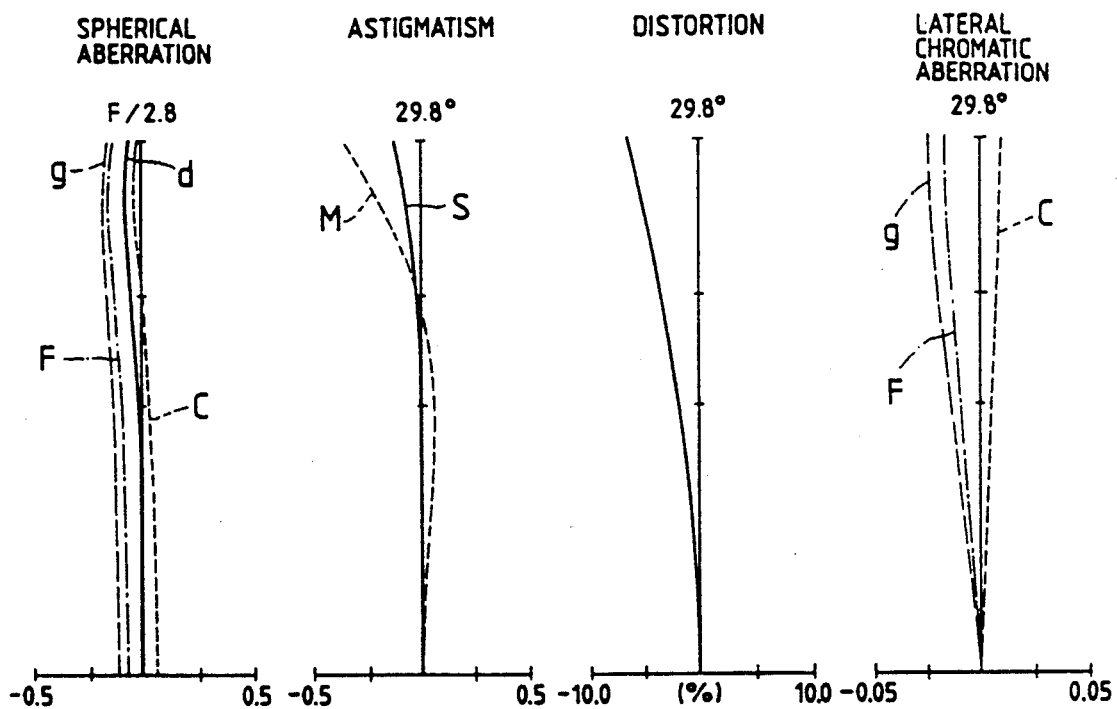
FIG. 38 through FIG. 40 show curves illustrating aberration characteristics of the Embodiment 9 of the present invention.
Figure 39:
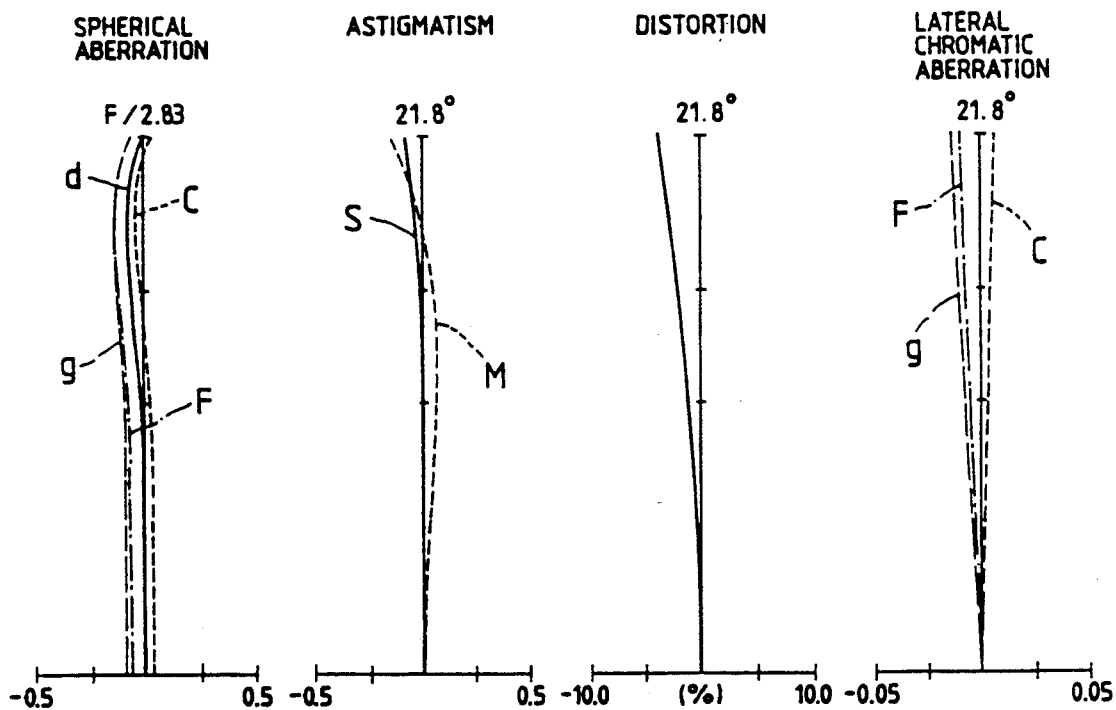
Figure 40:
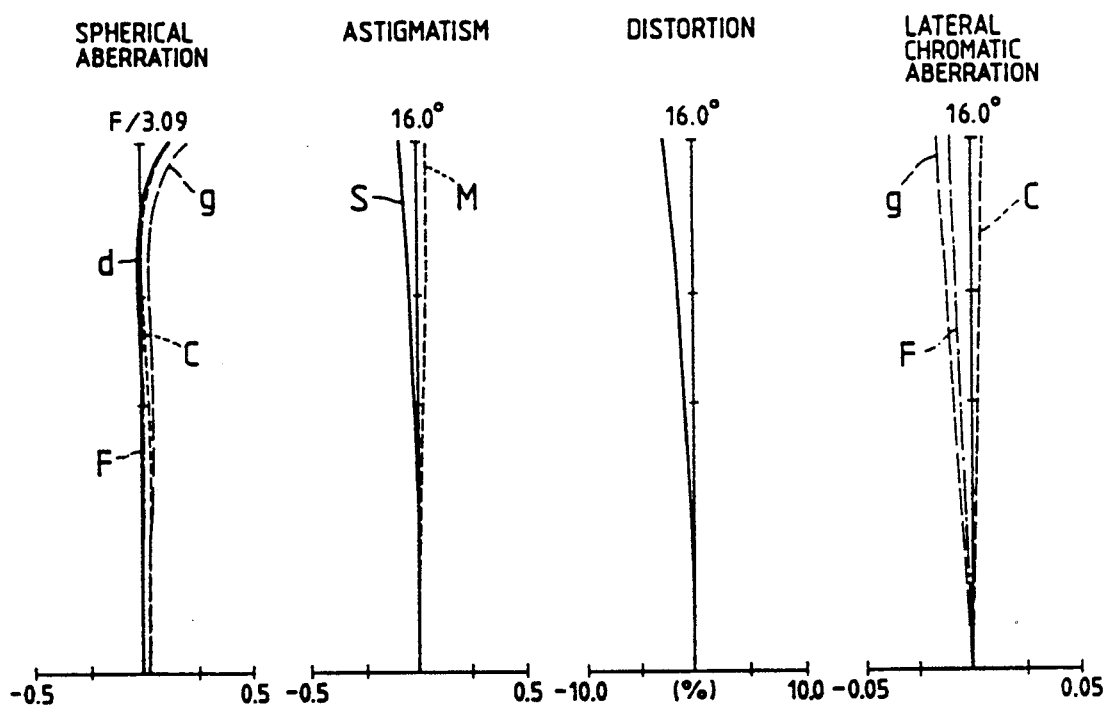

Aberration characteristics at the wide position, intermediate focal length and tele position of the Embodiment 9 for an object located at infinite distance are illustrated in FIG. 38, FIG. 39 and FIG. 40 respectively.

Figure 10:
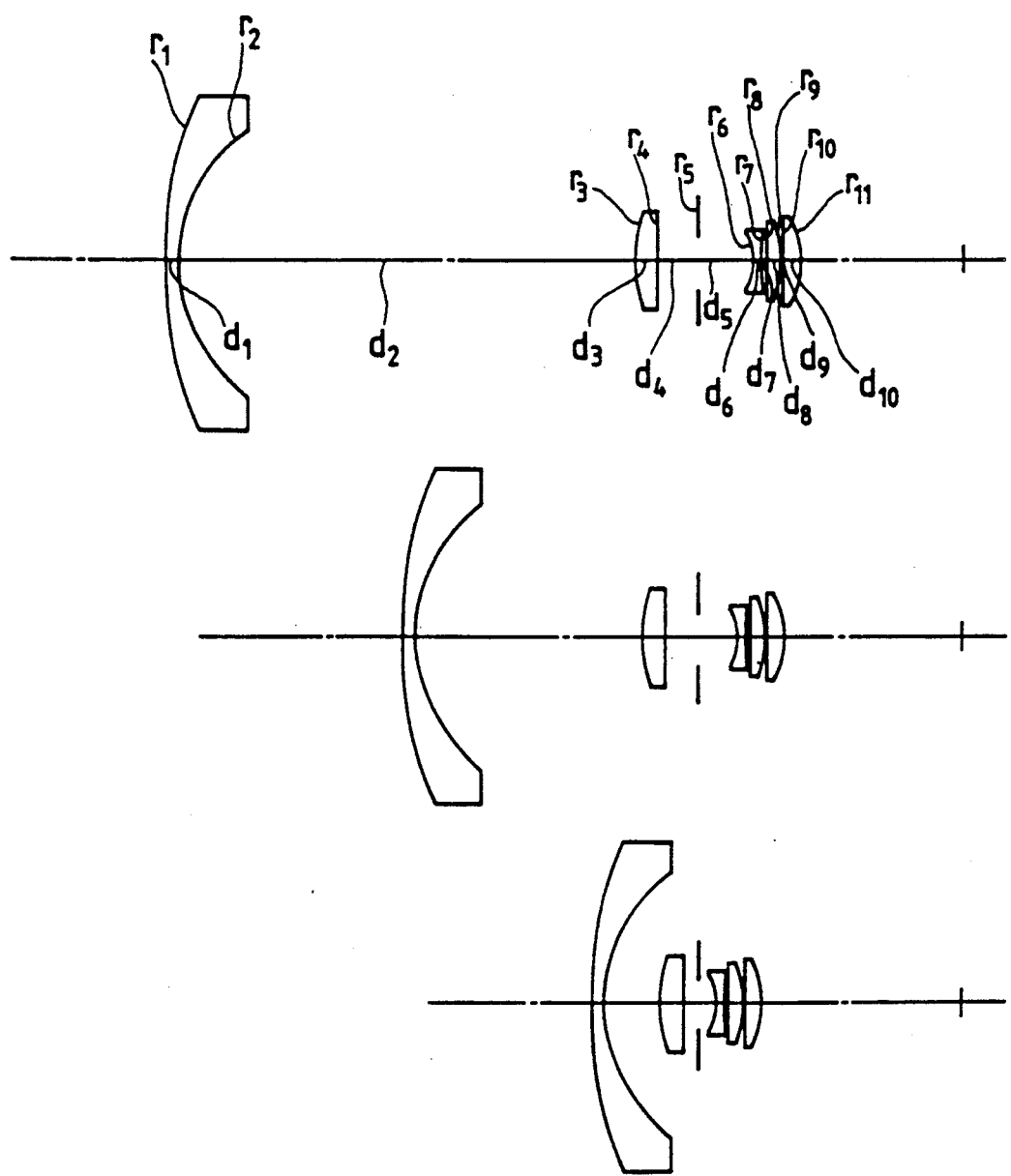

The Embodiment 10 has the composition shown in FIG. 10 wherein the first subunit consists of a single negative lens element, the second subunit consists of a single positive lens element, and the rear lens unit consists of a negative lens element, a positive lens element and a positive lens element. The object side surface of the first subunit and the extremely image side surface in the rear lens unit are designed as aspherical surfaces.

Figure 41:
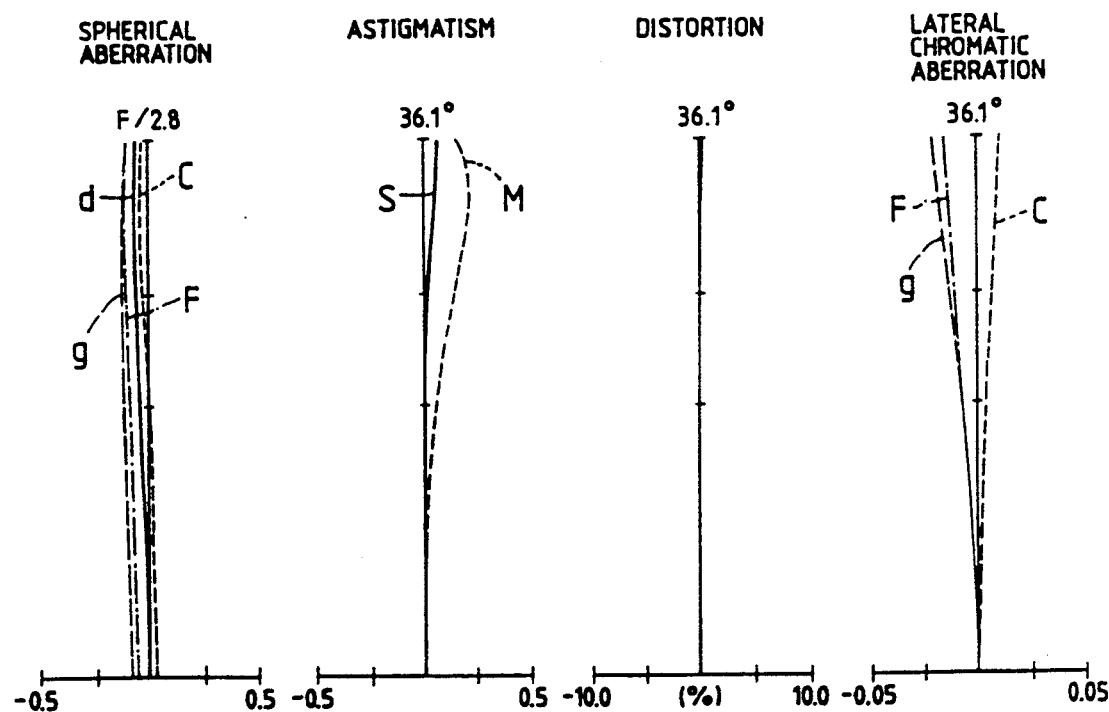
FIG. 41 through FIG. 43 show curves visualizing aberration characteristics of the Embodiment 10 of the present invention.
Figure 42:
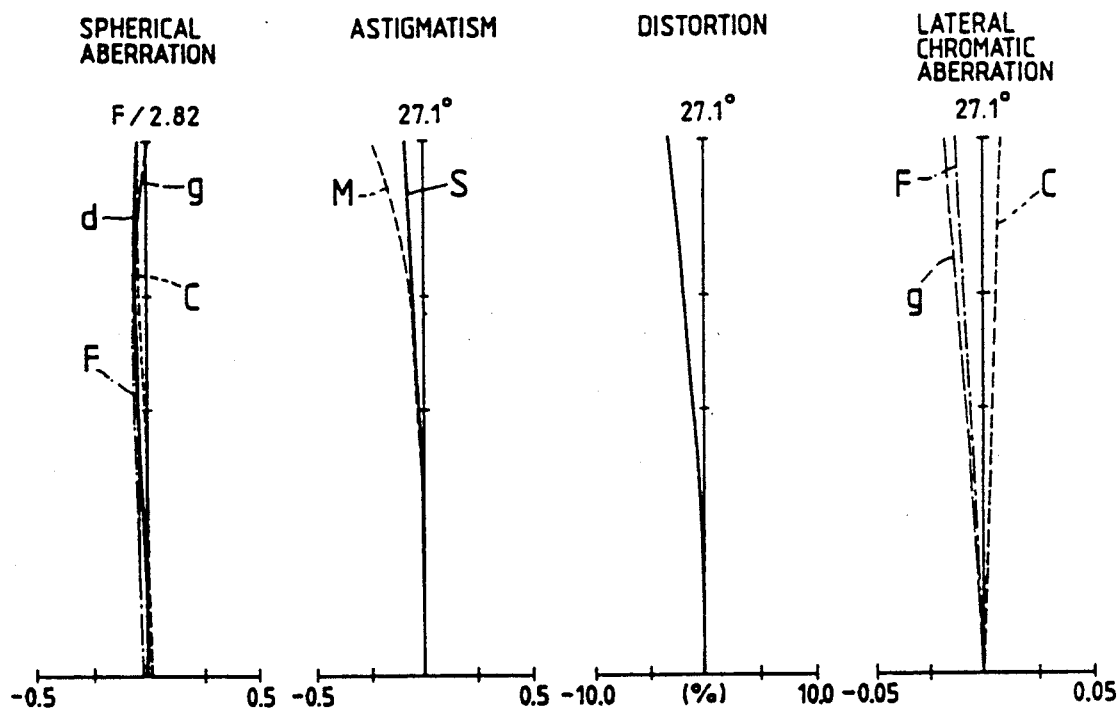
Figure 43:
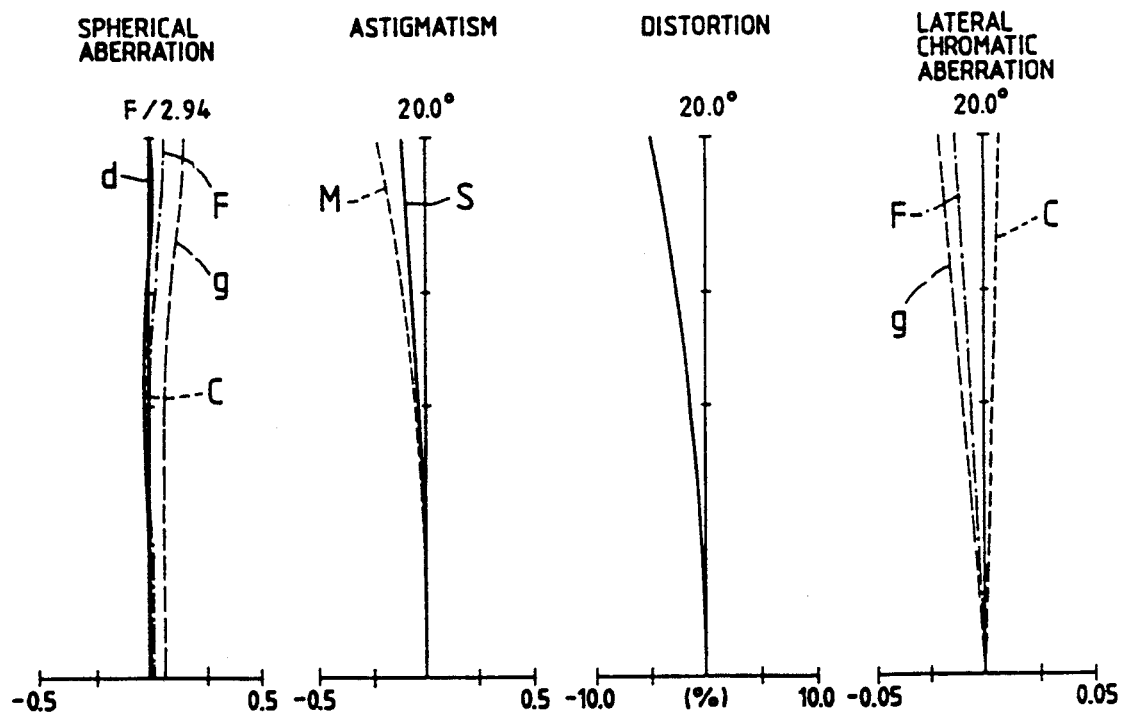

Aberration characteristics at the wide position, intermediate focal length and tele position of the Embodiment 10 for an object located at infinite distance are visualized in FIG. 41, FIG. 42 and FIG. 43 respectively.

Figure 11:
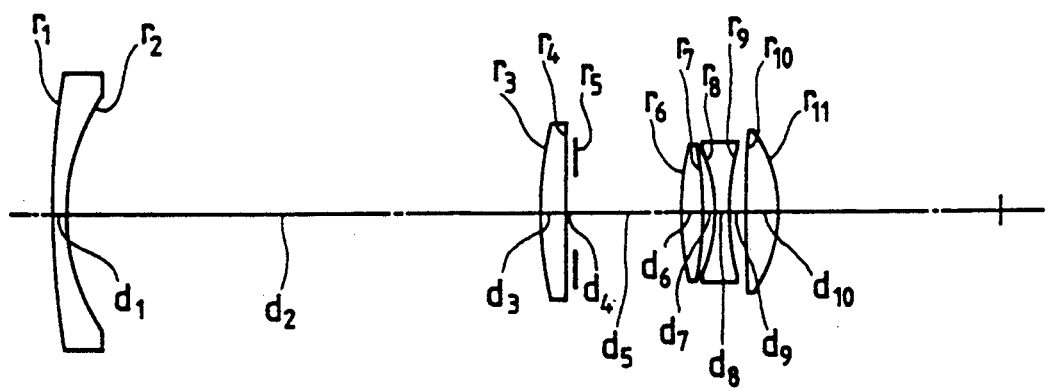
Figure 11:
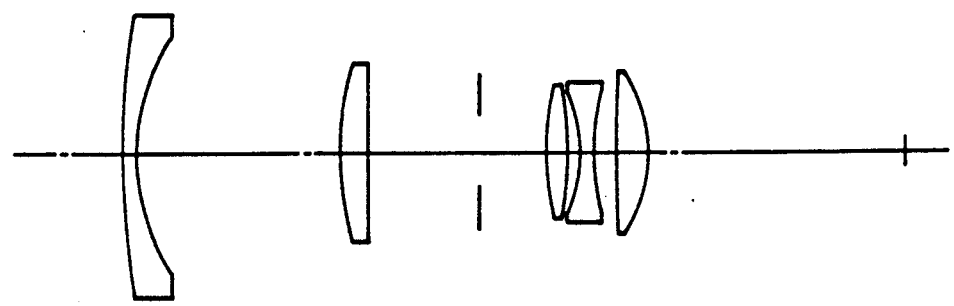
Figure 11:
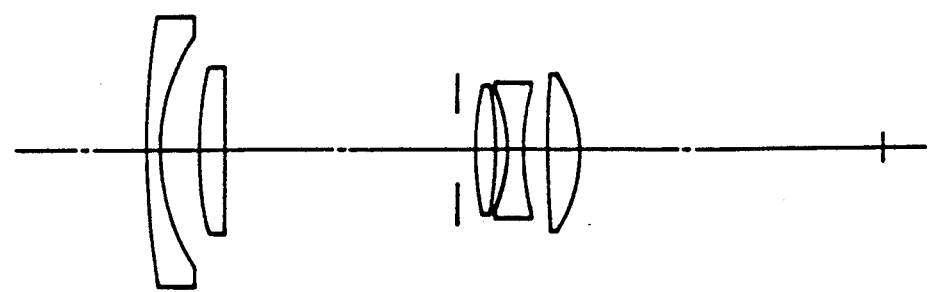

The Embodiment 11 through 13 are lens systems wherein the front lens unit is divided into a first subunit and a second subunit, and the rear lens unit is divided into a subunit 1F and a subunit 1R. The Embodiment 11 has the composition shown in FIG. 11 wherein the first subunit of the front lens unit consists of a single negative lens element, the second subunit consists of a single positive lens element, the subunit 1F of the rear lens unit consists of a positive lens element and a negative lens element, and the subunit 1R consists of a single positive lens element.

Figure 44:
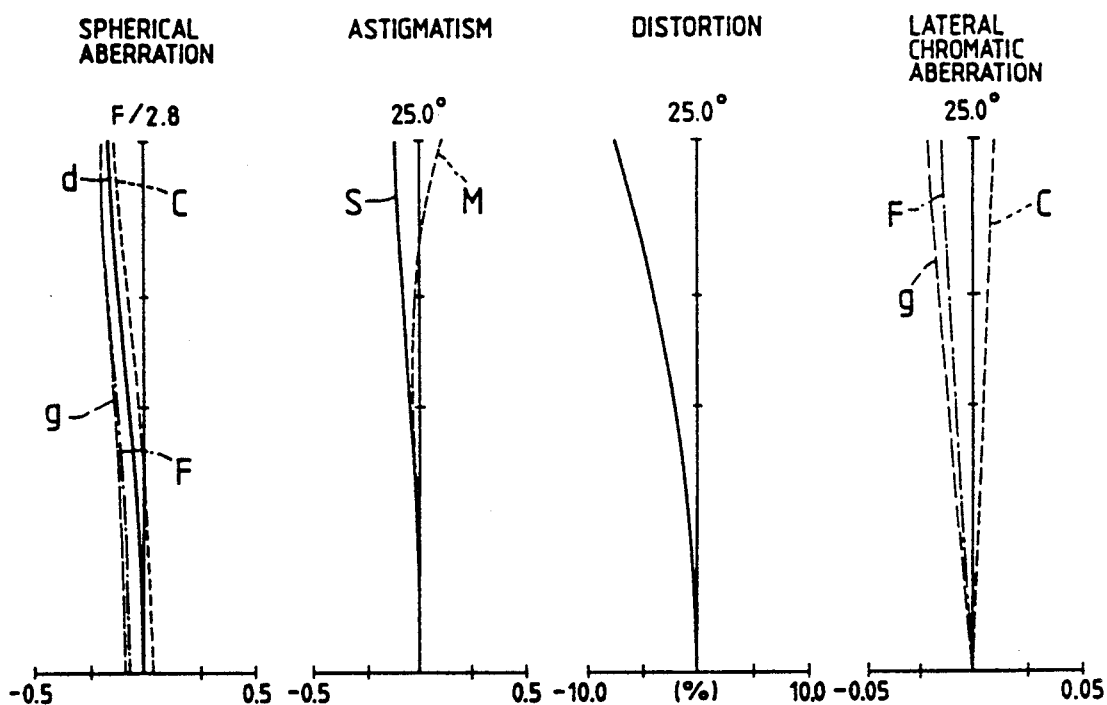
FIG. 44 through FIG. 46 show graphs illustrating aberration characteristics of the Embodiment 11 of the present invention.
Figure 45:
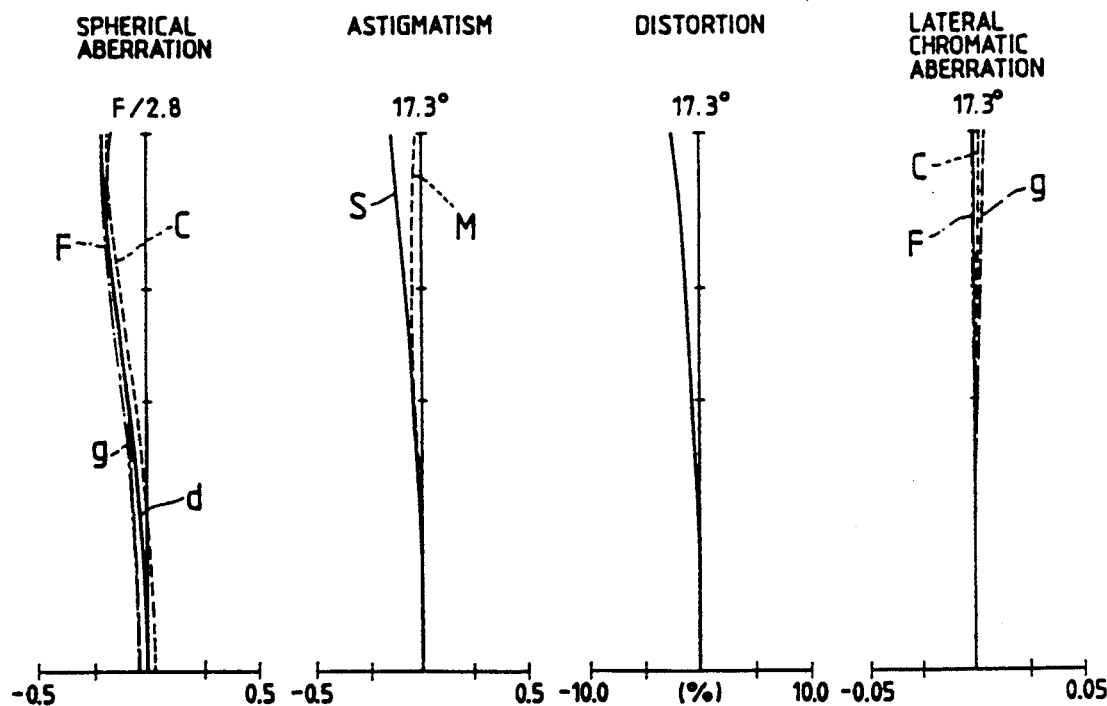
Figure 46:
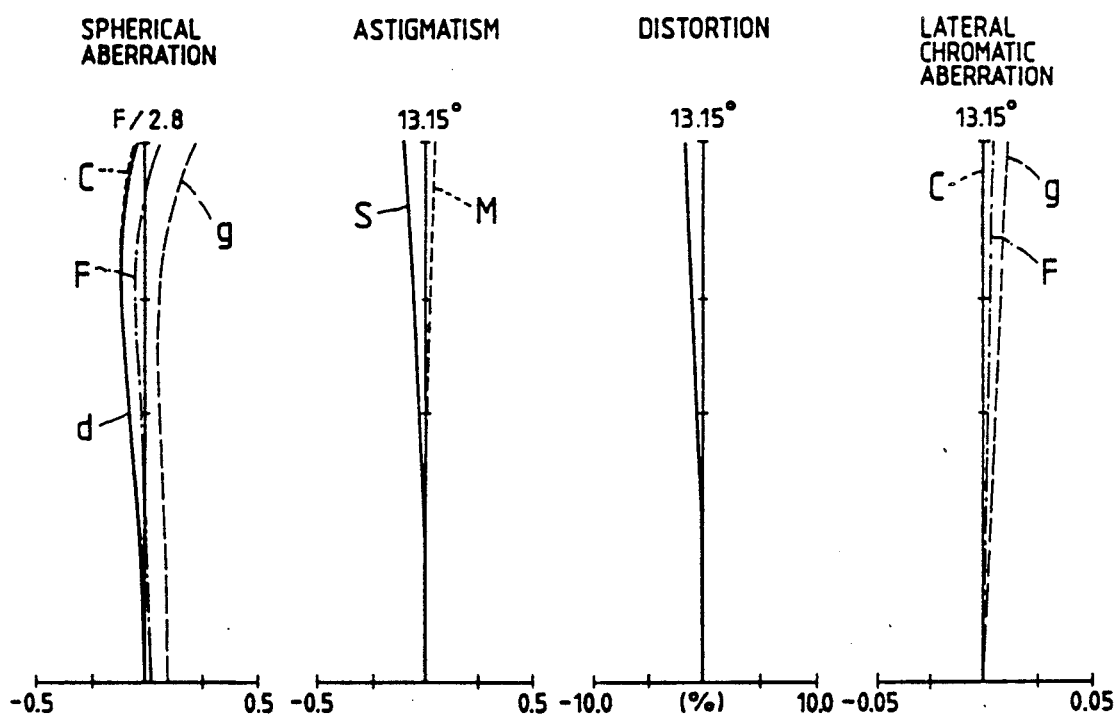

Aberration characteristics at the wide position, intermediate focal length and tele position of the Embodiment 11 for an object located at infinite distance are illustrated in FIG. 44, FIG. 45 and FIG. 46 respectively.

Figure 12:
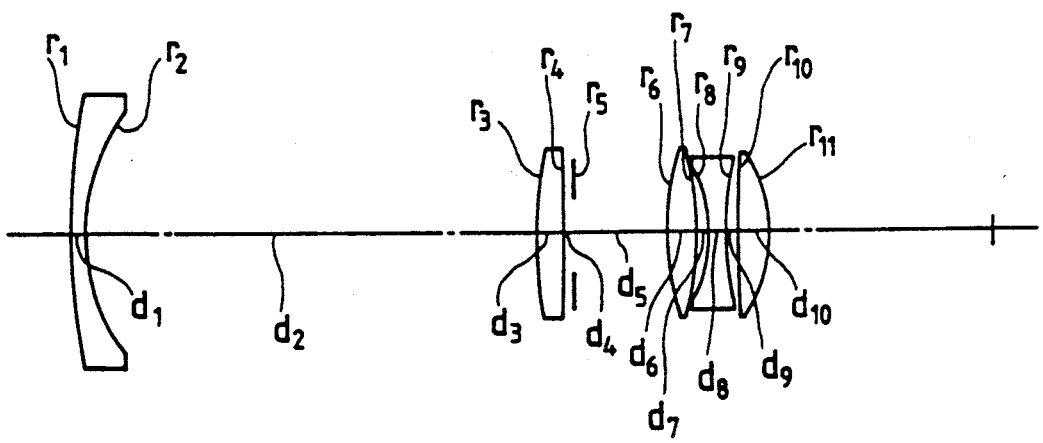
Figure 12:
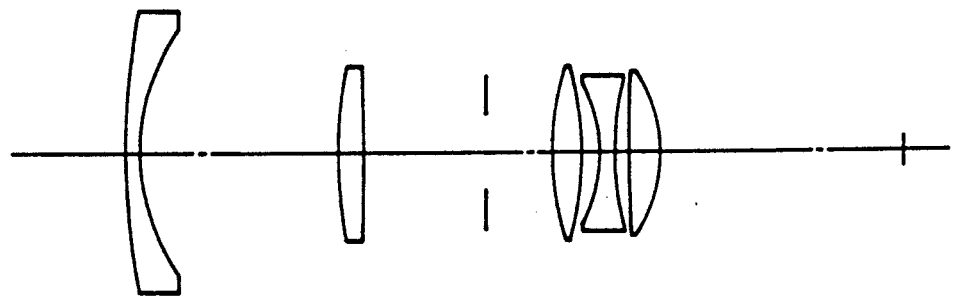
Figure 12:
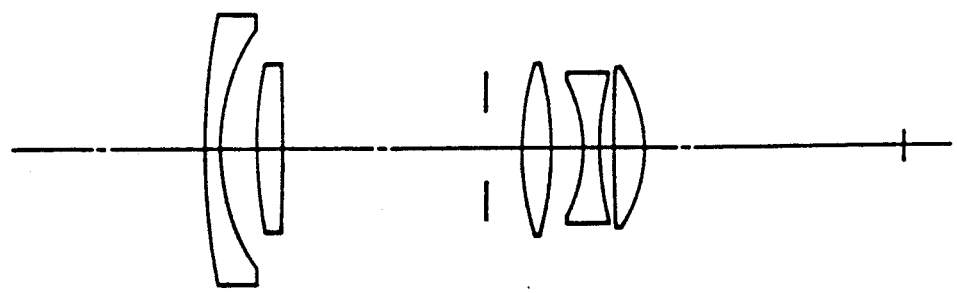

The Embodiment 12 has the composition shown in FIG. 12 wherein the first subunit consists of a single negative lens element, the second subunit consists of a single positive lens element, the subunit 1F consists of a single positive lens element, and the subunit 1R consists of a negative lens element and a positive lens element.

Figure 47:
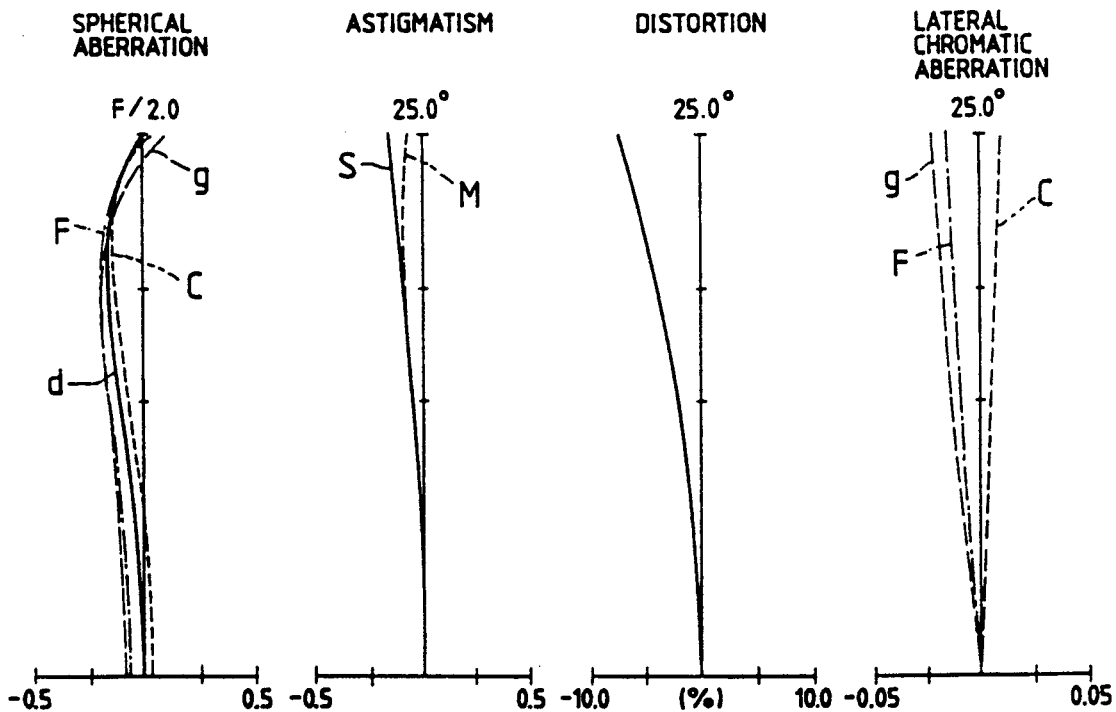
FIG. 47 through FIG. 49 show graphs visualizing aberration characteristics of the Embodiment 12 of the present invention.
Figure 48:
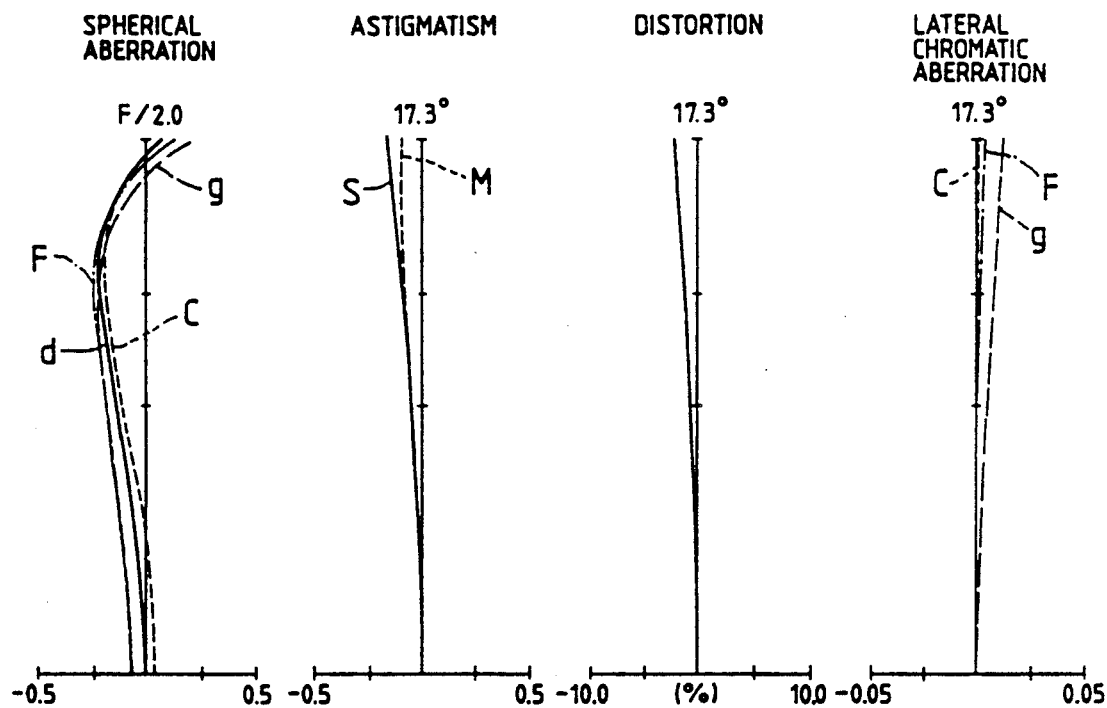
Figure 49:
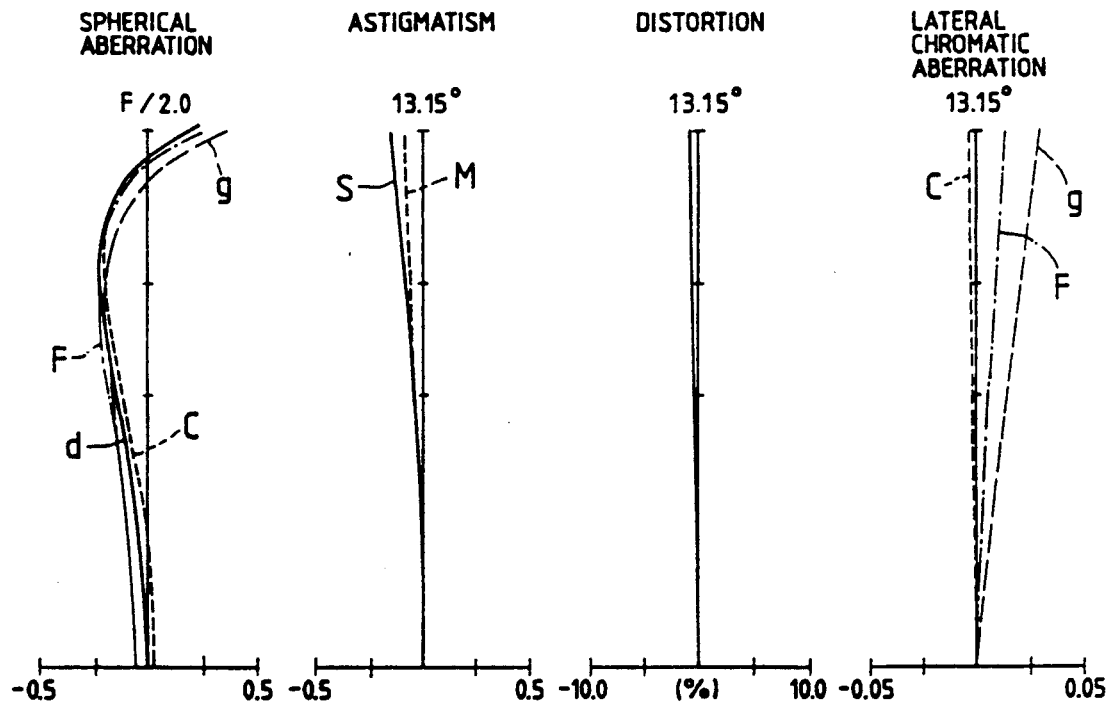

Aberration characteristics at the wide position, intermediate focal length and tele position of the Embodiment 12 for an object located at infinite distance are visualized in FIG. 47, FIG. 48 and FIG. 49 respectively.

Figure 13:
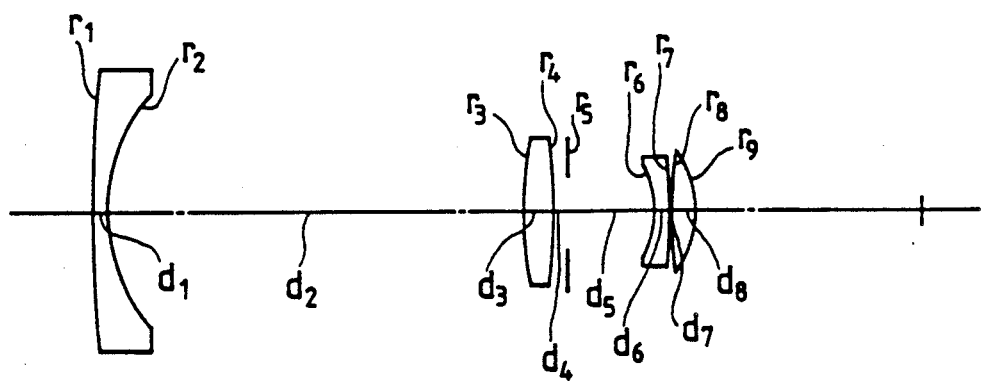
Figure 13:
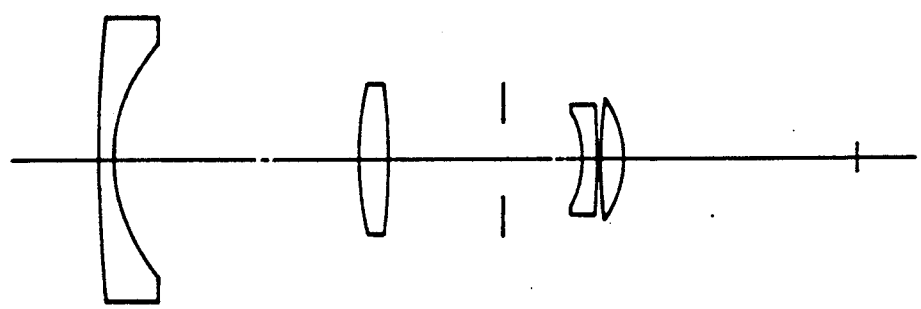
Figure 13:
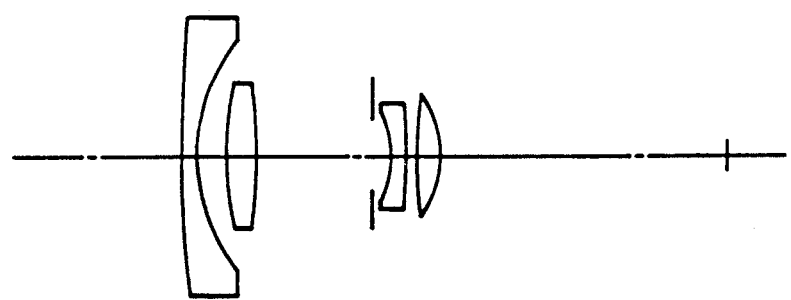

The Embodiment 13 has the composition shown in FIG. 13 wherein the first subunit consists of a single negative lens element, the second subunit consists of a single positive lens element, the subunit 1F consists of a single negative lens element and the subunit 1R consists of a single positive lens element. The image side surface of the subunit 1R is designed as an aspherical surface.

Figure 50:
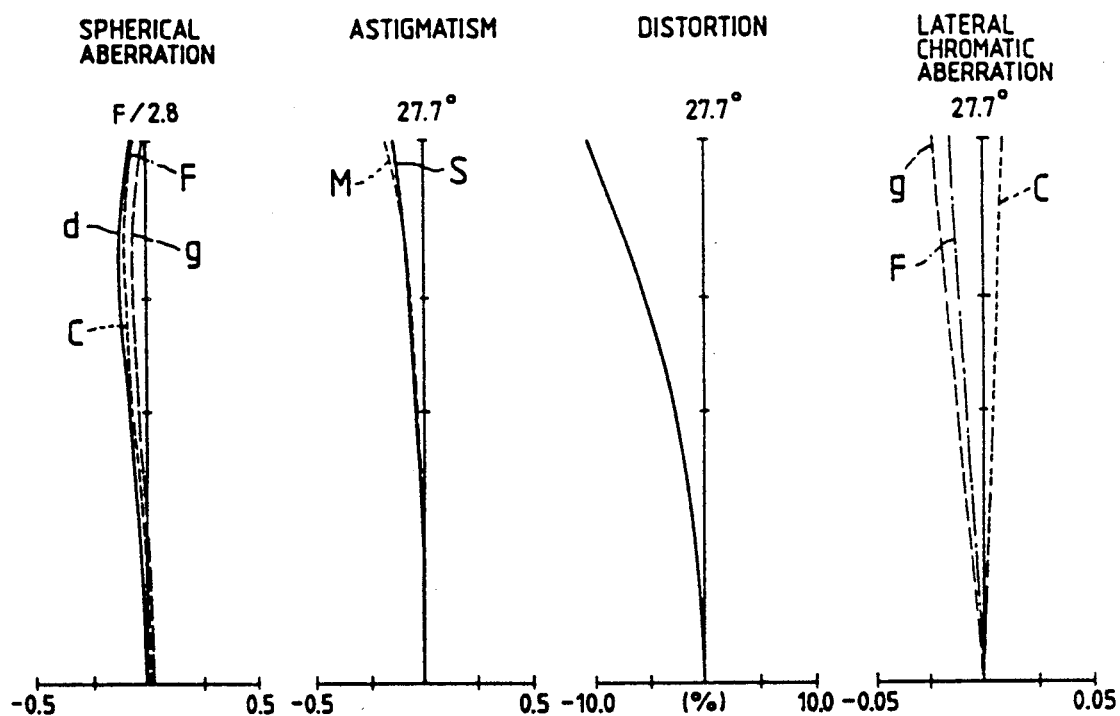
FIG. 50 through FIG. 52 show graphs visualizing aberration characteristics of the Embodiment 13 of the present invention.
Figure 51:
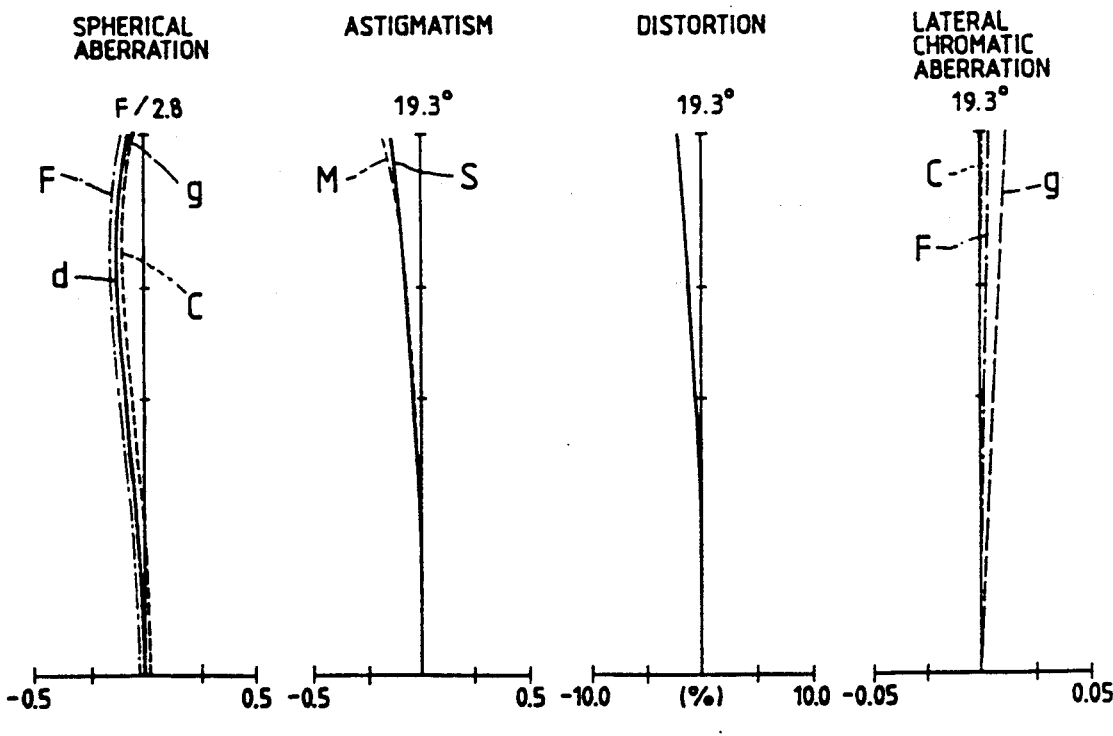
Figure 52:
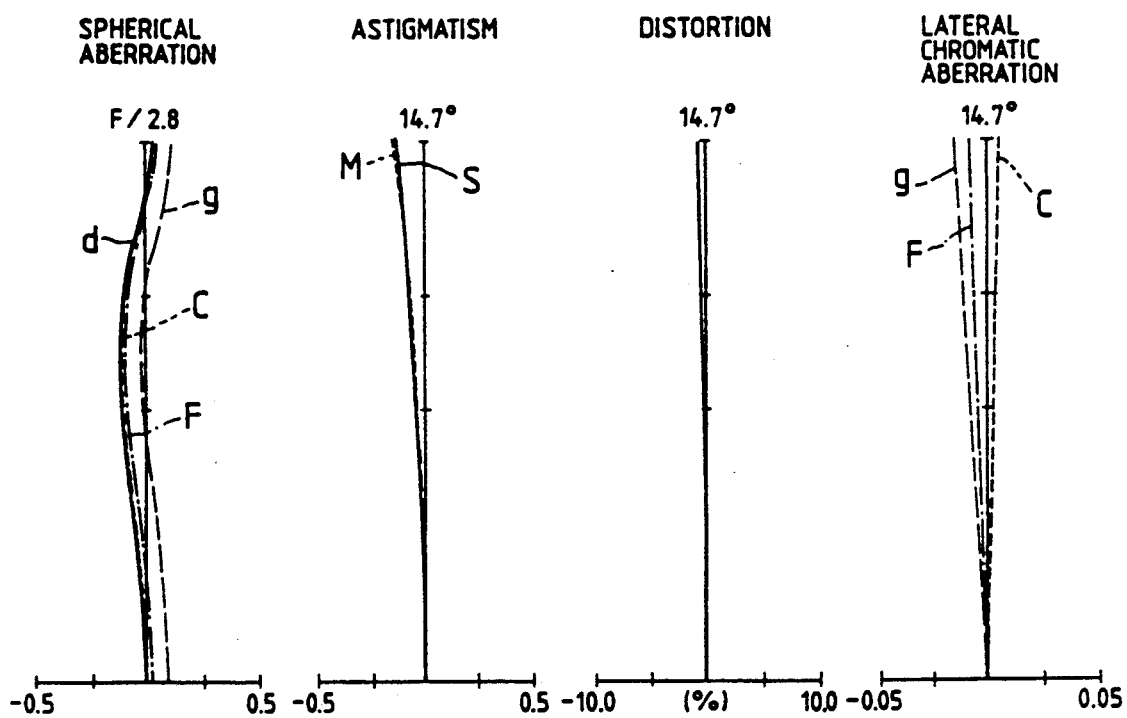

Aberration characteristics at the wide position, intermediate focal length and tele position of the Embodiment 13 for an object located at infinite distance are illustrated in FIG. 50, FIG. 51 and FIG. 52 respectively.

As is understood from the foregoing description, the vari-focal lens system according to the present invention is designed for a vari-focal ratio of 2 to 3, an aperture ratio on the order of F/2 to F/4.5, manufacturable at low cost, compact, light in weight and excellent in performance though said vari-focal lens system comprises a very small number of lens components, concretely four to six lens components, and has a simple composition.

We claim:

1. A vari-focal lens system comprising, in the order from the object side, a front lens unit consisting of a first subunit having negative refractive power and a second subunit consisting of a positive lens component, and rear lens unit having positive refractive power and including at least a negative lens element, and so adapted as to vary focal length with the image point kept at a fixed location by shifting the first subunit, the second subunit and the rear lens unit while changing relative positions thereof.

2. A vari-focal lens system according to claim 1 wherein said rear lens unit consists of a subunit 1F and a subunit 1R, and said vari-focal lens system is so adapted as to vary focal length by independently shifting the first subunit, the second subunit, the subunit 1F and the subunit 1R while changing relative positions thereof with the image point kept at a fixed location.

3. A vari-focal lens system according to claim 1 satisfying the following conditions (9) through (12):

(9) $1 < \beta_{2,R} < -0.1$
(10) $f_W/f_2 < 1.2$
(11) $f_W/f_R < 1$
(12) $\nu_{Rn} < 60$ wherein the reference symbol $\beta_{2R}$ represents total magnification of the second subunit and the rear lens unit at the wide position, the reference symbol $f_W$ designates focal length of the vari-focal lens system as a whole at the wide position, the reference symbol $f_2$ denotes focal length of the second subunit, the reference symbol $F_R$ represents focal length of the lens unit and the reference symbol $\nu_{Rn}$ denotes Abbe's number of the negative lens element arranged in the rear lens unit.

4. A vari-focal lens system according to claim 2, wherein said first subunit includes a negative lens element and said vari-focal lens system satisfies the following condition (13) through (16):

(13) $-2 < f_W/f_1 < -0.1$
(14) $0.1 < f_W/f_{234} < 1$
(15) $HH/f_W < 15$
(16) $EP/f_W < 5$
(17) $40 < \nu_1$ wherein the reference symbol $f_W$ represents focal length of the vari-focal lens system as a whole at the wide position, the reference symbol $f_1$ designates focal length of the first subunit, the reference symbol $f_{234}$ denotes total focal length of the first, second and third subunits at the wide position, the reference symbol HH represents distance between the principal points of the vari-focal lens system as a whole at the wide position, the reference symbol EP designates position of the entrance pupil at the wide position, and the reference symbol $\nu_1$ denotes Abbe's number of the first subunit.

5. A vari-focal lens system according to claim 3 or 4 wherein at least one of the surfaces of said first subunit is designed as an aspherical surface satisfying the following conditions (18):

(18) $|\Delta x_F|/h<1$ $(y=y_{EC})$ wherein the reference symbol $\Delta x_F$ represents deviation of said aspherical surface from the basic spherical surface, the reference symbol h designates maximum image height, the reference symbol y denotes height as measured from the optical axis and the reference symbol $y_{EC}$ represents height of the principal ray on the aspherical surface at the maximum field angle at the wide position.

6. A vari-focal lens system according to claim 3 or 4 wherein said second subunit or the rear lens unit comprises at least one aspherical surface satisfying the following condition (19):

(19) $|\Delta x_{2,R}/h<0.1$ $(y=y_{2,8})$ the reference symbol $\Delta x_{2,R}$ represents deviation of said aspherical surface from the standard spherical surface, the reference symbol h designates maximum image height and the reference symbol $y_{2,8}$ denotes height of the marginal ray having an aperture ratio of 2.8 on the aspherical surface.

7. A vari-focal lens system comprising, in the order from the object side,
   a movable front lens unit having negative refractive power and a movable rear lens unit having positive refractive power,
   said front lens unit having a negative lens component and a positive lens component,
   said rear lens unit having a subunit 1F and a subunit 1R comprising a negative lens element,
   an airspace reserved between the subunit 1F and the subunit 1R being variable for varying focal length, and
   said vari-focal lens system as a whole comprising at least three lens components.

8. A vari-focal lens system comprising, in the order from the object side,
   a movable front lens unit having negative refractive power and a movable rear lens unit having positive refractive power,
   said front lens unit having a negative lens component,
   said rear lens unit having a subunit 1F and a subunit 1R comprising a negative lens element,
   an airspace reserved between the subunit 1F and the subunit 1R being variable for varying focal length, and
   said vari-focal lens system as a whole comprising at least three lens components.

9. The vari-focal lens system according to claim 7 or 8 satisfying the following conditions (5), (6) (7) and (8):

(5) $-1>\beta_R<-0.1$
(6) $f_W/f_3<1.2$
(7) $f_W/f_4<1$
(8) $\nu_{4n}<60$ wherein the reference symbol $\beta_R$ represents magnification of the rear lens unit at the wide position, the reference symbol $f_3$ designates focal length of the third subunit, the reference symbol $f_4$ denotes focal length of the fourth subunit, the reference symbol $f_W$ represents focal length of the vari-focal lens system as a whole at the wide position and the reference symbol $\nu_{4n}$ designates Abbe's number of the negative lens element arranged in the fourth subunit.

10. A vari-focal lens system according to claim 9 wherein said rear lens unit further comprises a positive lens component having at least one aspherical surface and is so designed as to satisfy the following condition (4):

(4) $|\Delta x_R|/h<0.1$ $(y=y_{EC})$ wherein the reference symbol $\Delta x_R$ represents deviation of the aspherical surface used in the rear lens unit from the basic spherical surface thereof, the reference symbol h designates maximum image height, the reference symbol y denotes height as measured from the optical axis and the reference symbol $y_{EC}$ represents height of the principal ray on this surface at the maximum field angle at the wide position.

11. A vari-focal lens system according to claim 9 wherein said front lens unit comprises at least one aspherical surface having portions whose negative refractive power is weakened as they are farther from the optical axis and is so designed as to satisfy the following condition (3):

(3) $|\Delta x_F|/h<1$ $(y=y_{EC})$ wherein the reference symbol $\Delta x_F$ represents deviation of the aspherical surface used in the front lens unit from the basic spherical surface at a height of the principal ray on said aspherical surface at maximum field angle at the wide position, the reference symbol h designates maximum height, the reference symbol y denotes height as measured from the optical axis and the reference symbol $y_{EC}$ represents height of the principal ray on said aspherical surface at the maximum field angle at the side position.

12. A vari-focal lens system comprising, in the order from the object side,
   a movable front lens unit having negative refractive power,
   a movable rear lens unit having positive refractive power, and
   an aperture stop arranged between said front lens unit and said rear lens unit,
   said front lens unit having a negative lens component and a positive lens components,
   said rear lens unit comprising at least one negative lens element,
   said aperture stop being fixed for varying focal length, and
   said vari-focal lens system as a whole comprising at least three lens components.

13. A vari-focal lens system comprising, in the order from the object side,
   a movable front lens unit having negative refractive power,
   a movable rear lens unit having positive refractive power, and
   an aperture stop arranged between said front lens unit and said rear lens unit,
   said front lens unit having a negative lens component,
   said rear lens unit comprising at least one negative lens element, said aperture stop being fixed for varying focal length, and
   said vari-focal lens system as a whole comprising at least three lens components.

14. A vari-focal lens system according to claim 12 or 13 satisfying the following conditions (1) and (2):

(1) $0.1<F_W/f_F|<0.5$
(2) $0.2<f_W/f_R<0.8$ wherein the reference symbol $f_W$ represents focal length of the vari-focal lens system as a whole at the wide position, the reference symbol $f_F$ designates focal length of the front lens unit and the reference symbol $f_R$ denotes focal length of the rear lens unit.

15. A vari-focal lens system according to claim 14 wherein said front lens unit comprises at least one aspherical surface having portions whose negative refractive power is weakened as they are farther from the optical axis and is so designed as to satisfy the following condition (3):

(3) $|\Delta x_F|/h < 1$ $(y = y_{EC})$ wherein the reference symbol $\Delta X_F$ represents deviation of the aspherical surface used in the front lens unit from the basic spherical surface at a height of the principal ray on said aspherical surface at maximum field angle at the wide position, the reference symbol h designates maximum height, the reference symbol y denotes height as measured from the optical axis and the reference symbol $y_{EC}$ represents height of the principal ray on said aspherical surface at the maximum field angle at the wide position.

16. A vari-focal lens system according to claim 14 wherein said rear lens unit further comprises a positive lens component having at least one aspherical surface and is so designated as to satisfy the following condition (4):

(4) $|\Delta x_R|/h < 0.1$ $(y = y_{EC})$ wherein the reference symbol $\Delta x_R$ represents deviation of the aspherical surface used in the rear lens unit from the basic spherical surface thereof, the reference symbol h designates maximum image height, the reference symbol y denotes height as measured from the optical axis and the reference symbol $y_{EC}$ represents height of the principal ray on this surface at the maximum field angle at the wide position.

* * * * *